(12) United States Patent
Suzuki et al.

(10) Patent No.: US 9,488,751 B2
(45) Date of Patent: Nov. 8, 2016

(54) DROPLET OSCILLATION DEVICE AND DROPLET OSCILLATION METHOD

(71) Applicant: AKITA EPSON CORPORATION, Yuzawa, Akita (JP)

(72) Inventors: Yoichi Suzuki, Akita (JP); Kohei Shimoyama, Akita (JP); Shingo Abe, Akita (JP); Taro Aoki, Akita (JP)

(73) Assignee: AKITA EPSON CORPORATION, Akita (JP)

( * ) Notice: Subject to any disclaimer, the term of this patent is extended or adjusted under 35 U.S.C. 154(b) by 139 days.

(21) Appl. No.: 14/535,479

(22) Filed: Nov. 7, 2014

(65) Prior Publication Data

US 2015/0136869 A1    May 21, 2015

(30) Foreign Application Priority Data

| Nov. 15, 2013 | (JP) | 2013-237322 |
| Nov. 20, 2013 | (JP) | 2013-240184 |
| Oct. 6, 2014 | (JP) | 2014-205419 |
| Oct. 6, 2014 | (JP) | 2014-205420 |

(51) Int. Cl.
*B05B 12/08* (2006.01)
*G01V 8/12* (2006.01)

(52) U.S. Cl.
CPC ..................................... *G01V 8/12* (2013.01)

(58) Field of Classification Search
CPC .. B05B 12/082; B05B 5/0533; B05B 5/0535
USPC ........................................ 422/518, 106–108
See application file for complete search history.

(56) References Cited

U.S. PATENT DOCUMENTS

| 5,558,837 A * | 9/1996 | Tsukishima | H02N 13/00 222/195 |
| 7,955,557 B2 * | 6/2011 | Watari | B01F 11/0283 366/127 |
| 8,028,646 B2 * | 10/2011 | Pui | A61L 31/16 118/308 |
| 8,283,120 B2 | 10/2012 | Akagami et al. | |
| 8,617,899 B2 * | 12/2013 | De Bruyker | B01F 13/0071 422/224 |
| 2008/0247920 A1 * | 10/2008 | Pollack | B01F 11/0071 422/243 |
| 2012/0003669 A1 | 1/2012 | Minamiya et al. | |

FOREIGN PATENT DOCUMENTS

| JP | 2010-119388 A | 6/2010 |
| JP | 2012-013598 A | 1/2012 |

* cited by examiner

*Primary Examiner* — Brian R Gordon
(74) *Attorney, Agent, or Firm* — Global IP Counselors, LLP

(57) ABSTRACT

A droplet oscillation device includes upper and lower electrodes, a changing mechanism, a sensor and a controller. The lower electrode is configured to support a substrate thereon. The changing mechanism is configured to change a distance between the upper and lower electrodes. The sensor is configured to detect a droplet formed above a surface of the substrate opposite the upper electrode. The controller is configured to vary an applied voltage between the upper and lower electrodes to oscillate the droplet, and to determine whether the droplet is detected by the sensor. The controller is configured to respectively determine whether the droplet is detected under a plurality of conditions for which a frequency of the applied voltage or the distance are different, and to oscillate the droplet at the frequency and the distance of a condition for which the droplet is detected and for which the distance is greatest.

13 Claims, 19 Drawing Sheets

(REFERENCE EXAMPLE)

(AMPLITUDE: LARGE)

(AMPLITUDE: SMALL)

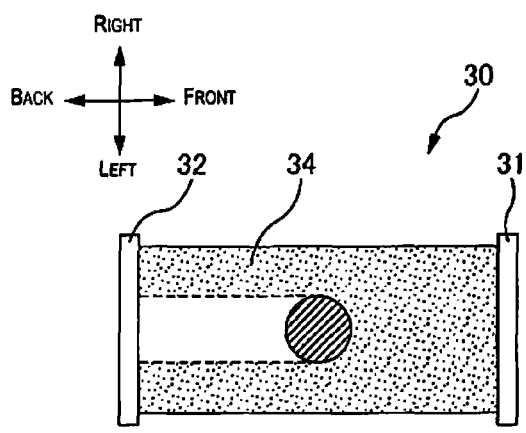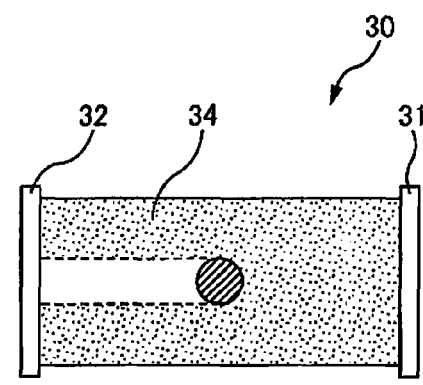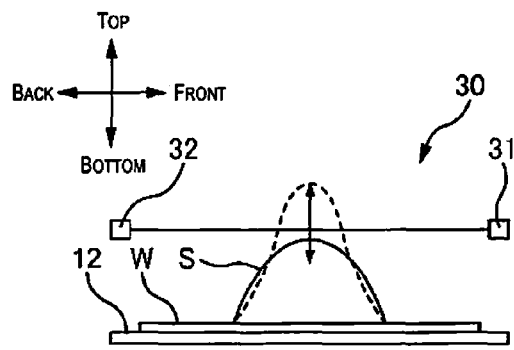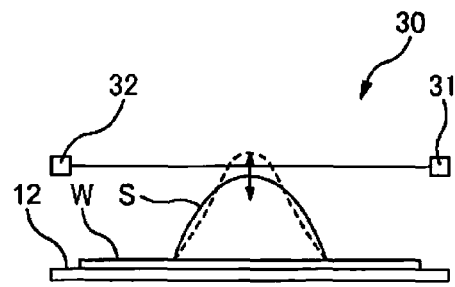
Fig. 13A                Fig. 13B

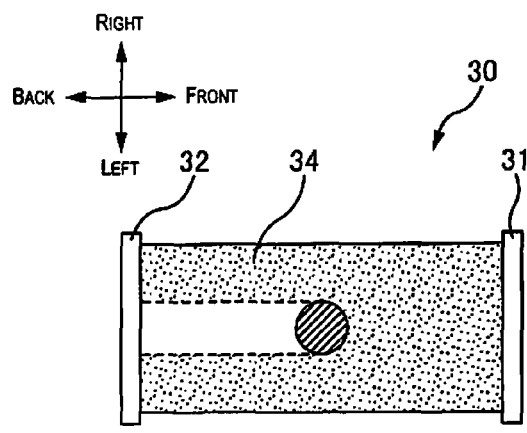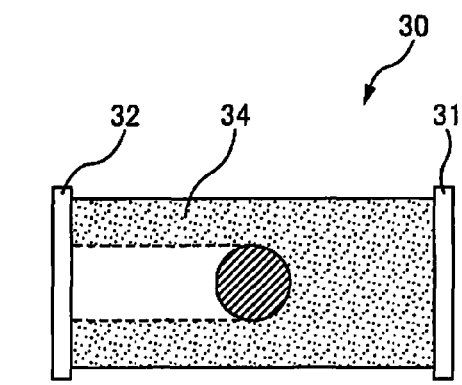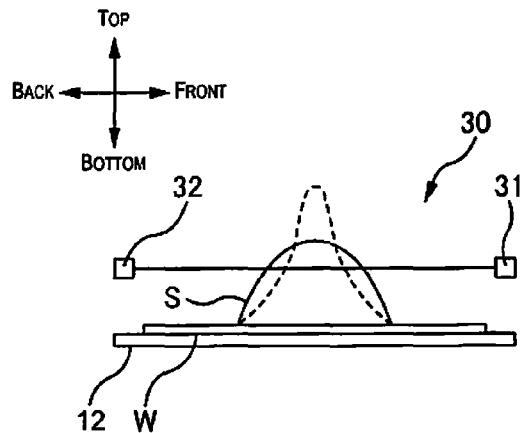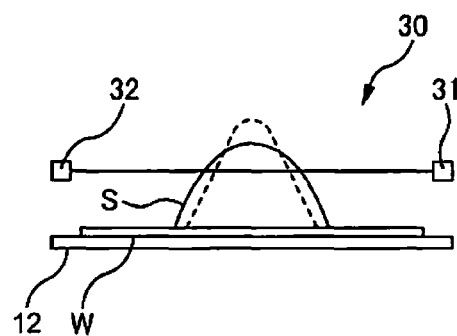
Fig. 15A          Fig. 15B

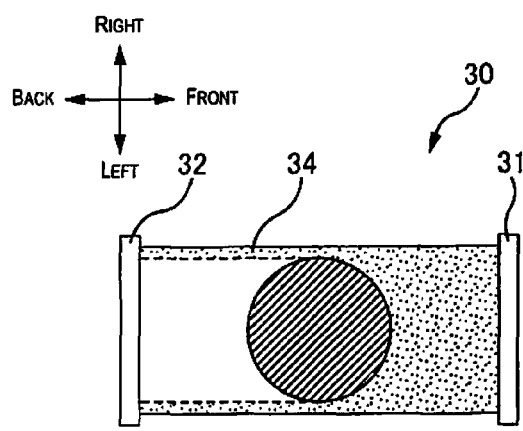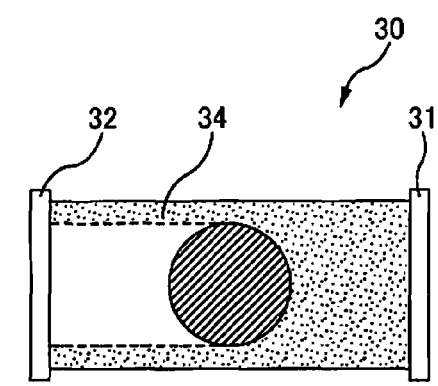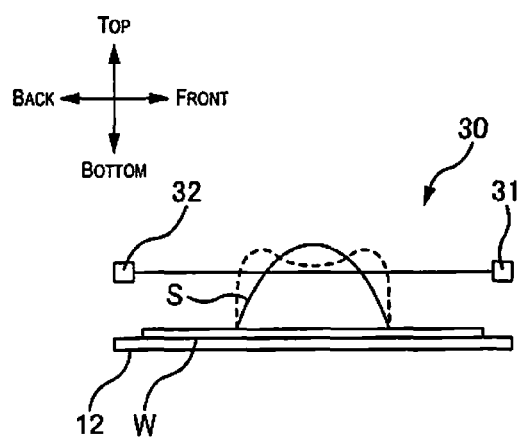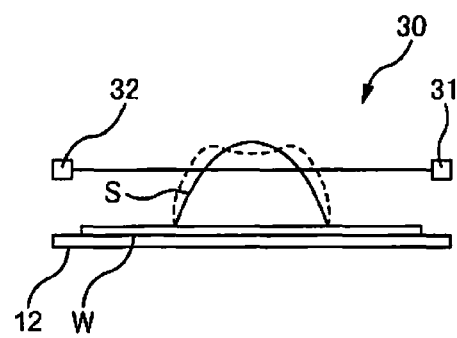
Fig. 17A          Fig. 17B

DROPLET OSCILLATION DEVICE AND DROPLET OSCILLATION METHOD

CROSS-REFERENCE TO RELATED APPLICATIONS

This application claims priority to Japanese Patent Application No. 2013-237322 filed on Nov. 15, 2013, Japanese Patent Application No. 2013-240184 filed on Nov. 20, 2013, Japanese Patent Application No. 2014-205419 filed on Oct. 6, 2014, Japanese Patent Application No. 2014-205420 filed on Oct. 6, 2014. The entire disclosures of Japanese Patent Application Nos. 2013-237322, 2013-240184, 2014-205419 and 2014-205420 are hereby incorporated herein by reference.

BACKGROUND

1. Technical Field

The present invention relates to a droplet oscillation device and a droplet oscillation method.

2. Related Art

There are devices that oscillate a droplet on a substrate using Coulomb force by varying the voltage applied between electrodes and by varying the electric field between electrodes. With Japanese Unexamined Patent Publication No. 2010-119388 and Japanese Unexamined Patent Publication No. 2012-13598, proposed is stirring a minute volume of a specimen (droplet) by oscillating a droplet using Coulomb force.

SUMMARY

To promote stirring of the specimen, it is preferable to make the amplitude of the droplet larger. However, the oscillation of the droplet changes due to various factors (droplet viscosity, appropriate volume of liquid, surface tension, temperature, droplet size, and the like), so it is difficult to obtain the optimal conditions for making the amplitude of the droplet larger in advance. Because of that, the operator used to adjust conditions such as the frequency of the applied voltage and the like while visually checking the droplet arranged in a narrow space between electrodes.

However, when the operator adjusts the conditions by visual check, there is the risk that variation may occur in the adjustment results depending on the operator.

One object of the present invention is to make it possible to obtain conditions that make the amplitude of the droplet larger automatically using a device.

A droplet oscillation device according to one aspect includes an upper electrode, a lower electrode, a changing mechanism, a sensor and a controller. The lower electrode is configured and arranged to support a substrate thereon. The changing mechanism is configured and arranged to change a distance between the upper electrode and the lower electrode opposite each other. The sensor is configured and arranged to detect a droplet formed above a surface of the substrate opposite to the upper electrode. The controller is configured to vary an applied voltage applied between the upper electrode and the lower electrode to oscillate the droplet, and to determine whether or not the droplet is detected by the sensor. The controller is configured to respectively determine whether or not the droplet is detected by the sensor under a plurality of conditions for which a frequency of the applied voltage or the distance are different, and to oscillate the droplet at the frequency and the distance of a condition among the plurality of conditions for which the droplet is detected by the sensor and for which the distance is greatest.

Other features of the present invention will be made clearer by this specification and the description of the attached drawings.

BRIEF DESCRIPTION OF THE DRAWINGS

Referring now to the attached drawings which form a part of this original disclosure:

FIG. 4A is an explanatory drawing of a template for drawing a water repellent circle of a prescribed diameter on the substrate W. FIG. 4B is an explanatory drawing of the state of drawing a water repellent circle on the substrate W. FIG. 4C is an explanatory drawing of the state of forming the droplet S on the substrate W.

FIG. 6A is an explanatory drawing of the state of the droplet S before the application of the voltage between the electrodes (before the generation of an electric field between electrodes). FIG. 6B is an explanatory drawing of the state of the droplet S when a high voltage is applied between electrodes (when a strong electric field is generated between electrodes). FIG. 6C is an explanatory drawing of the state of the droplet S when the application of the high voltage is cancelled (or when the applied voltage is rapidly reduced).

FIGS. 13A and 13B are summary explanatory drawings of the condition search method of the fourth embodiment.

FIG. 15A and FIG. 15B are summary explanatory drawings of the condition search method of the fifth embodiment.

FIG. 17A and FIG. 17B are summary explanatory drawings of the condition search method of a modification example of the fifth embodiment.

DETAILED DESCRIPTION OF EXEMPLARY EMBODIMENTS

Figure 1A:
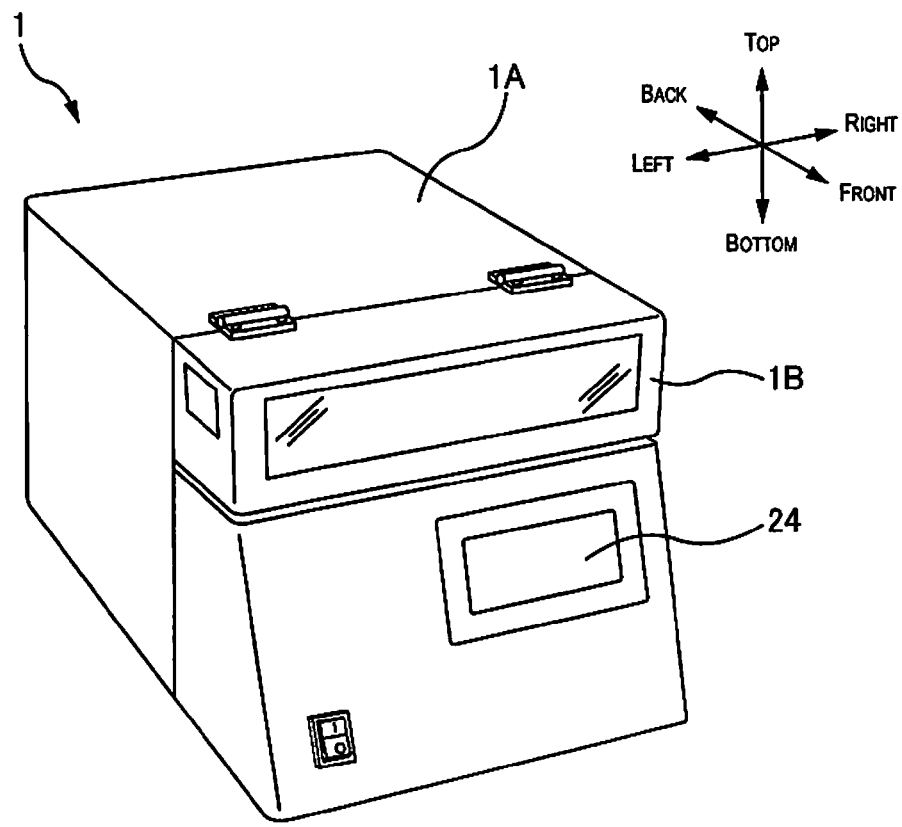
FIG. 1A is an overall perspective view of the droplet oscillation device 1.

At least the following items will become clear from this specification and the description of the attached drawings.

A droplet oscillation device will become clear that is equipped with an upper electrode, a lower electrode on which a substrate can be placed, a changing mechanism for changing the distance between the upper electrode and the lower electrode opposite each other, a sensor that can detect a droplet formed above a surface of the substrate opposite to the upper electrode, and a controller for varying the applied voltage applied between the upper electrode and the lower electrode and oscillating the droplet, and for determining whether or not the droplet is detected by the sensor, wherein the controller respectively determines whether or not the droplet was detected by the sensor under a plurality of conditions for which the applied voltage frequency or the distance are different, and of the plurality of conditions, oscillates the droplet at the frequency and the distance of the condition for which the droplet is detected by the sensor and for which the distance is greatest.

With this kind of droplet oscillation device, it is possible to acquire automatically using a device the conditions for making the amplitude of the droplet larger.

Preferably, the controller gradually changes the distance while keeping the frequency of the applied voltage at a first frequency, and respectively determines whether or not the droplet is detected by the sensor, changes the frequency of the applied voltage from the first frequency to a second frequency, gradually changes the distance while keeping at the second frequency, and respectively determines whether or not the droplet is detected by the sensor. By doing this, it is possible to reduce the number of times the frequency of the applied voltage is changed.

Preferably, the controller gradually changes the distance, and when reaching a state when the droplet is not detected from a state when it is detected by the sensor, or when reaching a state when the droplet is detected from a state when it is not detected by the sensor, changes the frequency of the applied voltage from the first frequency to the second frequency. By doing this, it is possible to reduce the number of conditions for determining whether the droplet reached the detection area.

Preferably, the controller gradually changes the frequency while keeping the distance at a first distance, respectively determines whether or not the droplet is detected by the sensor, changes from the first distance to a second distance, gradually changes the frequency while keeping at the second distance, and respectively determines whether or not the droplet is detected by the sensor. By doing this, it is possible to reduce the number of times the distance between electrodes is changed.

Preferably, the sensor is an area sensor having a detection area having a width in the direction parallel to the surface of the lower electrode on which the substrate is placed. By doing this, even if the position of the droplet is skewed by a small amount, it is possible to detect whether or not the droplet reached the detection area.

Preferably, when the droplet is detected by the sensor, and the droplet is oscillated at the frequency and the distance of the condition for which the distance is the greatest, when the droplet is no longer detected by the sensor, the distance is narrowed and the droplet is oscillated. By doing this, even if the oscillation of the droplet changes due to evaporation of the moisture of the droplet or the like, it is possible to suitably oscillate the droplet.

A droplet oscillation device will become clear that is equipped with an upper electrode, a lower electrode on which a substrate can be placed, a sensor that can detect a droplet formed above a surface of the substrate opposite to the upper electrode, and a controller for varying the applied voltage applied between the upper electrode and the lower electrode, and for oscillating the droplet on the substrate, wherein the sensor has a light receiving unit, and outputs signals according to the received light volume of the light receiving unit, and the controller oscillates the droplet under a plurality of conditions for which the frequency of the applied voltage differs, and of the plurality of conditions, oscillates the droplet at the frequency of the condition for which the signal change amount is greatest.

With this kind of droplet oscillation device, it is possible to obtain conditions for making the amplitude of the droplet larger automatically using a device.

Preferably, there is a detection area of the sensor between the upper electrode and the lower electrode, and the controller sets the distance between the upper electrode and the lower electrode so that the detection area of the sensor is higher than the apex when the droplet is still, and oscillates the droplet under a plurality of conditions for which the frequency of the applied voltage differs. By doing this, the condition (frequency) when the volume of liquid suctioned to the upper electrode side is high becomes the condition for which the droplet amplitude becomes large.

It is also possible to have it such that there is a detection area of the sensor between the upper electrode and the lower electrode, and the controller sets the distance between the upper electrode and the lower electrode so that the detection area of the sensor is lower than the apex when the droplet is still, and oscillates the droplet under a plurality of conditions for which the frequency of the applied voltage differs.

In this case, the controller preferably uses as the change amount the difference between, of the plurality of conditions, the signal of the sensor when the droplet is still, and the signal of the sensor indicating the greatest received light volume during oscillation of the droplet. By doing this, it is possible to obtain the condition (frequency) for which the amount of liquid suctioned to the upper electrode side is high.

Also, the controller uses as the change amount the difference between, of the plurality of conditions, the signal of the sensor when the droplet is still, and the signal of the sensor indicating the lowest received light volume during oscillation of the droplet. By doing this, it is possible to obtain the condition (frequency) for which the subduction of the apex of the droplet is large.

Also, the controller uses as the change amount the difference between, of the plurality of conditions, the signal of the sensor indicating that the received light volume is the greatest during oscillation of the droplet, and the signal of the sensor indicating that the received light volume is the lowest during oscillation of the droplet. By doing this, it is possible to obtain the condition (frequency) for which the liquid suctioned to the upper electrode side is the greatest, and the subduction of the apex of the droplet is large.

It is also possible to be further equipped with an injection device capable of discharging a liquid as a droplet on the substrate placed on the lower electrode. By doing this, a droplet oscillation device becomes clear for which it is possible to automatically discharge from an injection device a liquid such as for example a reagent, a cleaning solution or the like onto the substrate placed on the lower electrode.

A droplet oscillation method will become clear that uses an upper electrode and a lower electrode on which a substrate can be placed arranged opposite each other, varies the applied voltage applied between the upper electrode and the lower electrode, and oscillates a droplet on the substrate, including a step of respectively determining whether or not the droplet is detected by a sensor capable of detecting the droplet under a plurality of conditions for which the frequency of the applied voltage or the distance between the upper electrode and the lower electrode differs, and a step of, of the plurality of conditions, oscillating the droplet at the frequency and the distance when the droplet is detected by the sensor and at the condition for which the distance is the greatest.

With this kind of droplet oscillation method, it is possible to obtain conditions that make the amplitude larger automatically with a device.

Preferably, within a prescribed time when the droplet is oscillated, when the droplet is no longer detected by the sensor, the distance between the upper electrode and the lower electrode is narrowed a prescribed volume at a time until the droplet is detected by the sensor. By doing this, it is possible to more accurately obtain the optimal conditions for oscillating the droplet.

Preferably, within a prescribed time when the droplet is oscillated, when the droplet is no longer detected by the sensor, the droplet is oscillated under a plurality of conditions for which the applied voltage frequency or the distance differs, a determination is made respectively of whether or not the droplet is detected by the sensor, and these steps are repeated. By doing this, it is possible to more reliably obtain the optimal conditions for oscillating the droplet.

Preferably, within a prescribed time when the droplet is oscillated, when the droplet is no longer detected by the sensor, the distance between the upper electrode and the lower electrode is narrowed a prescribed volume at a time until the droplet is detected by the sensor, and when the distance reaches a prescribed value or less and the droplet is still not detected by the sensor, an error is notified. By doing this, it is possible to sense an abnormal situation such as that the droplet has jutted beyond a prescribed range on the substrate or the like, and to redo the step of oscillating the droplet.

A droplet oscillation method will become clear which, using an upper electrode, a lower electrode on which a substrate can be placed, and a sensor that can detect a droplet formed above a surface of the substrate opposite to the upper electrode, varies the applied voltage that is applied between the upper electrode and the lower electrode, and oscillates a droplet on the substrate, wherein the sensor has a light receiving unit, and outputs signals according to the received light volume of the light receiving unit, and the droplet oscillation method includes a step of oscillating the droplet under a plurality of conditions for which the frequency of the applied voltage differs, and of the plurality of conditions, searches for the condition for which the change amount of the signal is the greatest, and a step of oscillating the droplet at the frequency under the condition for which the change amount is the greatest among the signals.

With this kind of droplet oscillation method, it is possible to automatically obtain the condition that will make the amplitude of the droplet larger.

Preferably, within a prescribed time that the droplet is oscillated, when changes in the signals are no longer detected by the sensor, the droplet is oscillated under a plurality of conditions for which the frequency of the applied voltage differs, and with the droplet oscillation method, repeated are a step of, among the plurality of conditions, searching for the condition at which the change amount of the signal is the greatest, and a step of oscillating the droplet at the frequency of the condition for which the change amount is the greatest among the signals. By doing this, it is possible to reliably oscillate the droplet by for example searching automatically for the optimal conditions even when a variation in the droplet volume occurs or the like within the prescribed time.

First Embodiment

Droplet Oscillation Device

Figure 1B:
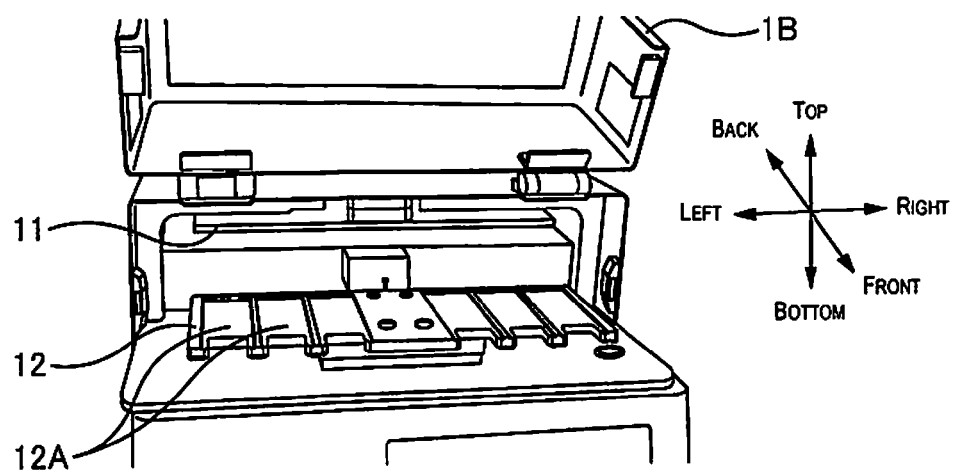
FIG. 1B is a perspective view of the state when the cover 1B of the droplet oscillation device 1 is opened.
Figure 2A:
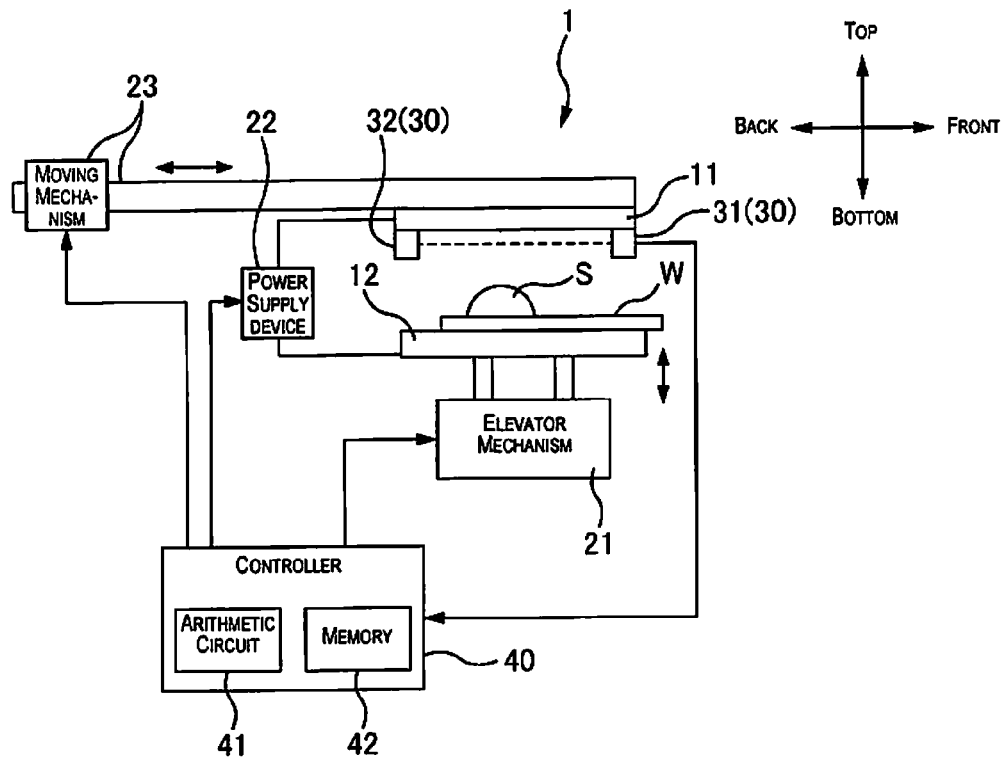
FIG. 2A and FIG. 2B are block diagrams of the droplet oscillation device 1.
Figure 2B:
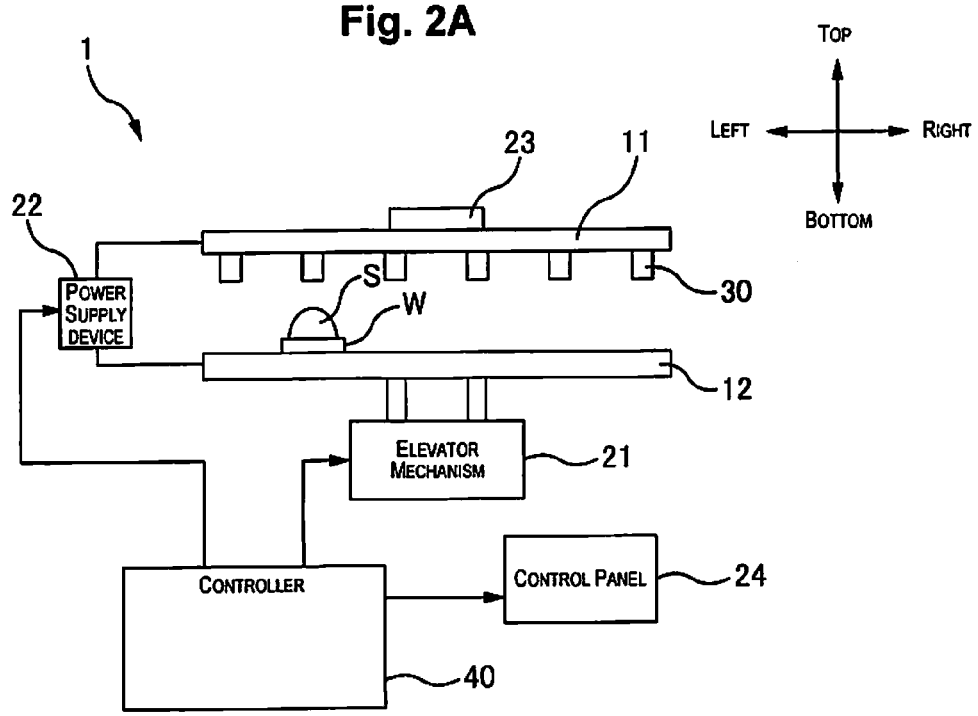

FIG. 1A is an overall perspective view of a droplet oscillation device 1. FIG. 1B is a perspective view of the state when a cover 1B of the droplet oscillation device 1 is opened. FIG. 2A and FIG. 2B are block diagrams of the droplet oscillation device 1.

With the description hereafter, the vertical direction, front-back direction, and lateral direction are defined as shown in FIG. 1A. Specifically, the direction vertical to the placement surface of the droplet oscillation device 1 is the "vertical direction," the direction in which gravity works is "down," and the reverse direction to the direction in which gravity works is "up." The side at which the droplet oscillation device 1 cover 1B opens (side of the operator seen from the droplet oscillation device 1) is "front," the reverse side is "back," and this is used to define "front-back direction." Also, the "lateral direction," "right," and "left" are defined according to the direction seen from the operator operating the droplet oscillation device 1.

The droplet oscillation device 1 is a device that oscillates a droplet S on a substrate W using Coulomb force by varying the applied voltage between electrodes and varying the electric field between electrodes. The droplet oscillation device 1 has an upper electrode 11, a lower electrode 12, an elevator mechanism 21, an area sensor 30, and a controller 40. Also, the droplet oscillation device 1 has a power supply device 22 for applying voltage to the electrodes and a moving mechanism 23 for moving the upper electrode 11 in the front-back direction. These constitutional elements of the droplet oscillation device 1 are stored inside a case 1A. A control panel 24 is provided on the front surface of the case 1A.

The upper electrode 11 and the lower electrode 12 are electrodes arranged opposite each other. The upper electrode 11 is a plate shaped electrode arranged further to the upper side than the lower electrode 12. The lower surface of the upper electrode 11 faces downward (the lower surface is parallel to the front-back direction and the lateral direction). The upper electrode 11 is moved in the front-back direction by the moving mechanism 23. As shown in FIG. 1B, when the cover 1B is open, the upper electrode 11 is positioned at the back side, and from this position, the upper electrode 11 is moved to the front side by the moving mechanism 23, and faces opposite the lower electrode 12.

The lower electrode 12 can have the substrate W (glass plate or plastic plate) placed on its top surface. Here, six substrates W can be placed there. Six grooves 12A are formed along the front-back direction on the top surface of the lower electrode 12, and the substrates W are placed along the respective grooves 12A. Because of that, the lengthwise direction of the substrate W placed on the lower electrode 12 is parallel to the front-back direction. As is described later, the droplet S is formed on the substrate W placed on the lower electrode 12.

The power supply device 22 is a device for applying voltage to the electrodes. Here, with the upper electrode 11 as the reference potential, the power supply device 22 applies a rectangular wave for which the potential difference is about 4 kV to the lower electrode 12 at a prescribed frequency. When the power supply device 22 applies the rectangular wave of a prescribed frequency to the electrodes, the electric field between the upper electrode 11 and the lower electrode 12 is varied, and the droplet S on the substrate W is oscillated by Coulomb force. The power supply device 22 is equipped with a high voltage amplifier, and as is described later, it is possible to change the frequency of the rectangular wave according to instructions from a controller 40.

The elevator mechanism 21 is a mechanism for changing the distance between the upper electrode 11 and the lower electrode 12 opposite each other. Here, the elevator mechanism 21 changes the distance between the upper electrode 11 and the lower electrode 12 (distance between electrodes) by raising and lowering the lower electrode 12. However, it is also possible to change the distance between electrodes by raising and lowering the upper electrode 11 rather than the lower electrode 12. Hereafter, the distance between the upper electrode 11 and the lower electrode 12 is noted as "the distance between electrodes."

Figure 3A:
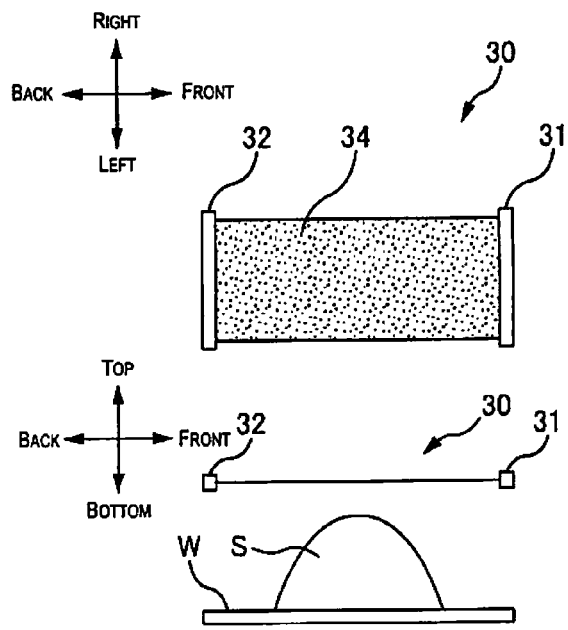
FIG. 3A and FIG. 3B are explanatory drawings of the area sensor 30.
Figure 3B:
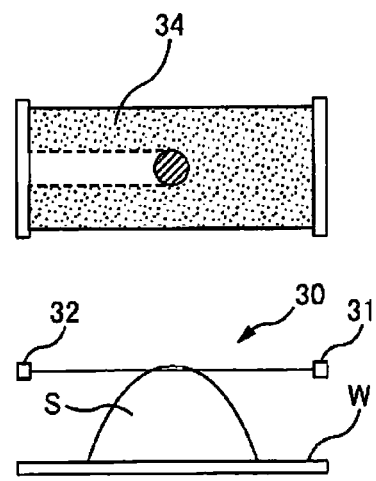

The area sensor 30 is a sensor that can detect obstacles (here, droplet S) on a detection area. FIG. 3A and FIG. 3B are explanatory drawings of the area sensor 30. The top section of each drawing shows the state of the area sensor 30 and the droplet S when the droplet oscillation device 1 is seen from above, and the lower section shows the state of the area sensor 30 and the droplet S when the droplet oscillation device 1 is seen from the left side. The area sensor 30 has a light emitting unit 31 and a light receiving unit 32, the light emitting unit 21 faces the light receiving unit 32 and irradiates detected light 34, and the light receiving unit 32 outputs detection signals according to the received light volume. The light emitting unit 31 and the light receiving unit 32 are arranged opposite in the front-back direction here, and the detected light 34 is irradiated along the front-back direction. When there is an obstacle blocking the detected light 34 in the detection area, the received light volume of the light receiving unit 32 decreases, and the area sensor 30 detects the droplet S. At this time, the light receiving unit 32 outputs a detection signal according to the decreased received light volume. As a result, the detection signal of the area sensor 30 becomes a signal indicating the size of the obstacle in the detection area.

Here, the detected light 34 indicates light irradiated from the light emitting unit 31 that can be received at the light receiving unit 32, and does not include light in the direction moving away from the light receiving unit 32. The light irradiated by the light emitting unit 31 can include not only the light that can be received by the light receiving unit 32, but also light in the direction moving away from the light receiving unit 32. The detected light 34 can be infrared light, and can also be visible light. Also, the detection area indicates the area in which the detected light 34 is irradiated between the light emitting unit 31 and the light receiving unit 32.

As shown in FIG. 2, the area sensor 30 is fixed to the lower side of the upper electrode 11, and the detection area of the area sensor 30 is separated by a fixed distance (e.g. 2 mm to 3 mm) downward from the lower surface of the upper electrode 11. By doing this, before the apex of the droplet S touches the lower surface of the upper electrode 11, it is possible for the area sensor 30 to detect the droplet S. The distance between the area sensor 30 detection area and the upper electrode 11 is fixed.

Six area sensors 30 are attached to the lower side of the upper electrode 11. Since it is possible to place six substrates W on the lower electrode 12, the area sensors 30 are attached to as to respectively detect the droplet S on each substrate W. Because of this, the six area sensors 30 are arranged so as to be aligned in the lateral direction.

As described later, the area sensor 30 is used to determine the size of the amplitude of the droplet S. As a method for detecting the size of the amplitude, there is a method of analyzing an image taken by a camera, but with this method, it is necessary to have a camera and an expensive arithmetic circuit for image analysis and the like. In contrast to this, with this embodiment, using inexpensive area sensors 30, it is possible to determine the size of the amplitude of the droplet S by combining with the operation of the elevator mechanism 21 described later.

FIG. 3A and FIG. 3B are explanatory drawings of the area sensor 30. The upper section of each drawing shows the state viewed from above, and the lower section shows the state viewed from the left side. The diagonal cross hatching area of the top drawing in FIG. 3B shows the droplet S area (area when droplet S has reached the detection area) higher than the detection area of the area sensor 30 in the vertical direction, and here, shows the area of the droplet S blocking the detected light 34. With this embodiment, using the area sensor 30, the detection area has width in the lateral direction. By doing this, even if there is slight skew of the droplet S position in the lateral direction, it is possible for the area sensor 30 to detect that droplet S has reached the detection area.

Figure 3C:
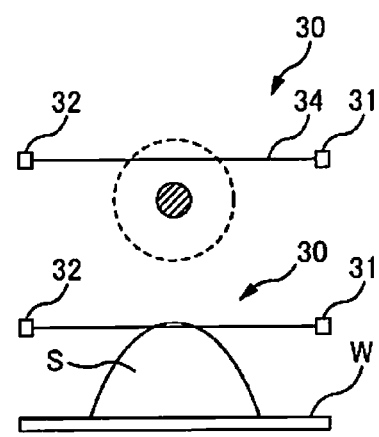
FIG. 3C is an explanatory drawing of the sensor of a reference example.

FIG. 3C is an explanatory drawing of the sensor of a reference example. With the reference example, the detection area of the sensor does not have width in the lateral direction. Because of that, with the reference example, when the position of the droplet S is skewed in the lateral direction, there are cases when the sensor cannot detect the droplet S even when the apex of the droplet S is at a position higher than the detected light 34 of the sensor.

In FIG. 2, the controller 40 is the control unit that is in charge of controlling the droplet oscillation device 1. The controller 40 has an arithmetic circuit 41 and a memory 42. The arithmetic circuit 41 is a compact arithmetic circuit such as a CPU, MPU or the like, for example. The memory 42 is a storage means constituted from ROM, RAM or the like, stores control programs and data tables, and provides an area for expanding a control program. The controller 40 controls each constitutional element (e.g. the elevator mechanism 21, the power supply device 22, the moving mechanism 23 and the like) of the droplet oscillation device 1 by the arithmetic circuit 41 executing the control program stored in the memory 42, and realizes the various processes (e.g. the condition search process described later).

Figure 4A:
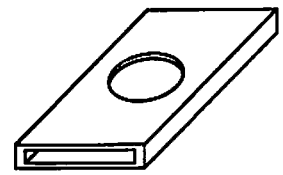
FIG. 4A through FIG. 4C are explanatory drawings of the state of the droplet S formed on the substrate W.
Figure 4B:
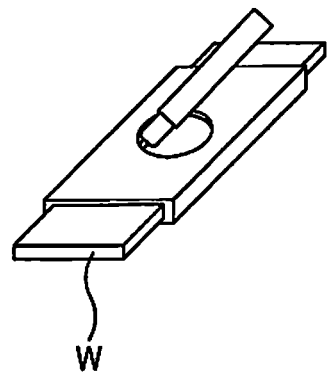
Figure 4C:
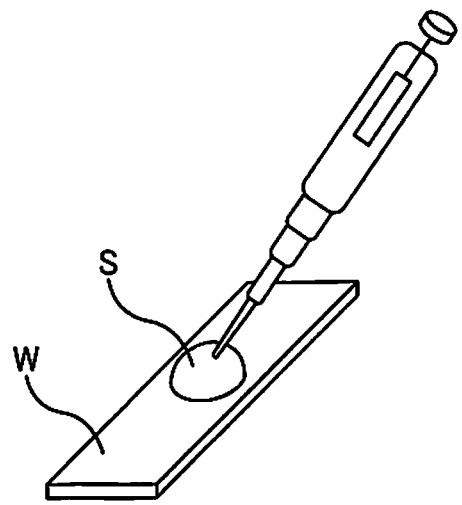

FIG. 4A through FIG. 4C are explanatory drawings of the state of the droplet S formed on the substrate W. FIG. 4A is an explanatory drawing of a template for drawing a water repellent circle of a prescribed diameter on the substrate W. The template is a tube shaped member in which the substrate W can be inserted. A circular hole of a prescribed diameter is formed on the top surface of the template.

FIG. 4B is an explanatory drawing of the state of drawing a water repellent circle on the substrate W. It is also possible to implement a hydrophilic coating on the top surface of the substrate W. After inserting the substrate W into the template, the operator draws a water repellent circle on the top surface of the substrate W with a water repellent pen according to the hole on the top surface of the template. The size of the water repellent circle is set as appropriate according to the volume of the droplet S. The minimum volume of droplet S with this embodiment is 150 μL, and the maximum volume is 600 μL. For example, when 150 μL or 200 μL of the droplet S is formed, a water repellent circle of diameter 12 mm is drawing, and when 400 μL or 600 μL of the droplet S is formed, a water repellent circle of diameter 20 mm is drawn.

Because a template is used, it is possible to draw a water repellent circle of a desired diameter. Also, because a template is used, it is possible to draw a water repellent circle at a prescribed position on the substrate W, so when the substrate W on which the droplet S is formed is placed on the lower electrode 12, it is possible to match the lateral position of the droplet S on the substrate W with the lateral position of the detection area of the area sensor 30. The detected light 34 of the area sensor 30 is irradiated along the front-back direction, so drawing of the water repellent circle skewed in the insertion direction of the template (substrate W lengthwise direction: front-back direction when placing on the lower electrode 12) is allowed.

FIG. 4C is an explanatory drawing of the state of forming the droplet S on the substrate W. The operator drops a prescribed volume of droplet S (e.g. a reagent) on the water repellent circle drawn on the substrate W. By dropping the droplet S on the water repellent circle, the apex of the droplet S on the substrate W swells up, and the droplet S becomes a dome shape (see FIG. 6A). As a result, it is easier for the Coulomb force to act on the apex of the droplet S, and easier for the amplitude of the droplet S to become larger when the electric field between the electrodes is varied.

Figure 5A:
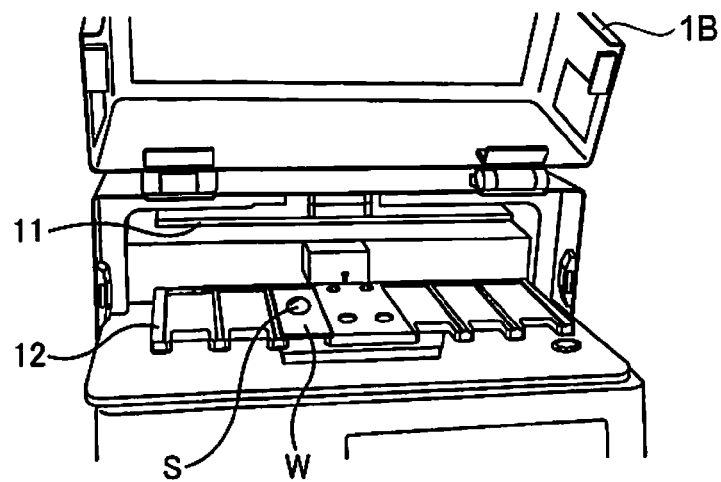
FIG. 5A through FIG. 5C are explanatory drawings of the operation of the droplet oscillation device 1.
Figure 5B:
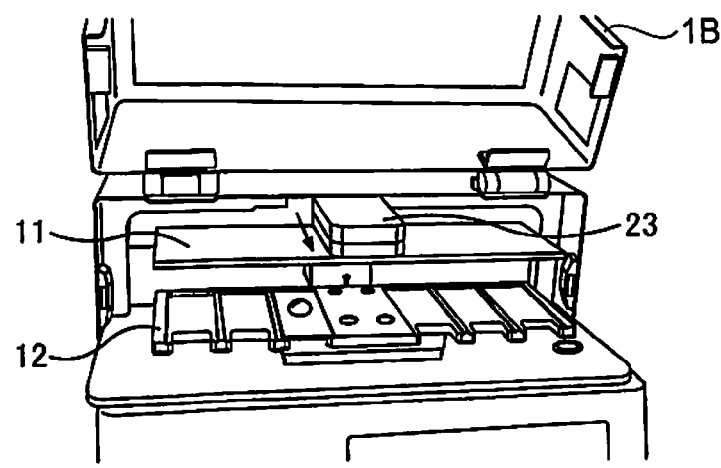
Figure 5C:
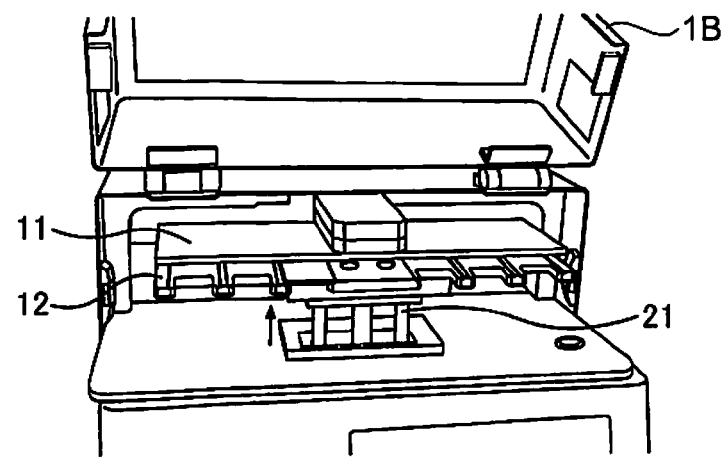

FIG. 5A through FIG. 5C are explanatory drawings of the operation of the droplet oscillation device 1.

As shown in FIG. 5A, the operator places the substrate W on which the droplet S is formed onto the lower electrode 12. When the cover 1B is opened, the upper electrode 11 is positioned to the back side, and above the lower electrode 12 is cleared, so the operator is able to place the substrate W on the lower electrode 12 without being obstructed by the upper electrode 11.

When the substrate W is placed on the lower electrode 12 and the operator gives prescribed instructions to the control panel 24, as shown in FIG. 5B, the controller 40 controls the moving mechanism 23 and moves the upper electrode 11 to the front side, and faces the upper electrode 11 opposite the lower electrode 12. After that, as shown in FIG. 5C, the controller 40 controls the elevator mechanism 21 and raises the lower electrode 12 to the upper side. By doing this, the distance between the upper electrode 11 and the lower electrode 12 becomes shorter, and it is possible to generate a stronger electric field between the electrodes. After that, the controller 40 controls the power supply device 22, applies to the lower electrode 12 a rectangular wave of a prescribed frequency with the upper electrode 11 as the reference potential, varies the electric field between the electrodes, and oscillates the droplet S on the substrate W.

Figure 6A:
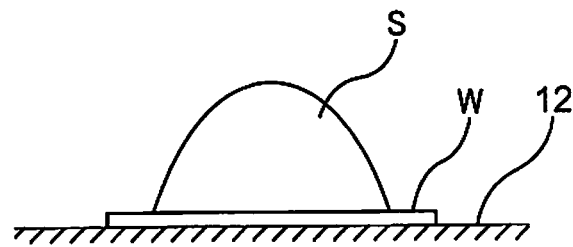
FIG. 6A through FIG. 6C are explanatory drawings of the oscillation of the droplet S.
Figure 6B:
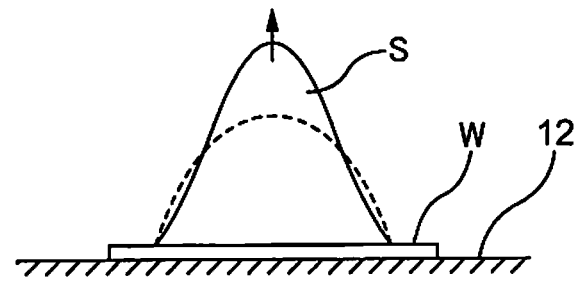
Figure 6C:
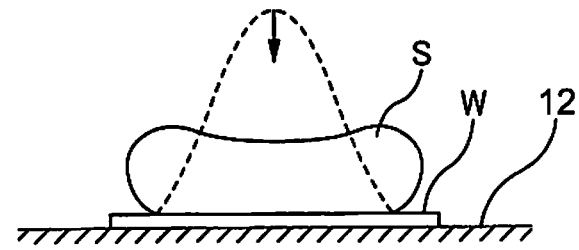

FIG. 6A through FIG. 6C are explanatory drawings of the oscillation of the droplet S.

FIG. 6A is an explanatory drawing of the state of the droplet S before the application of the voltage between the electrodes (before the generation of an electric field between electrodes). The droplet S on the substrate W is in a dome shape, and the apex of the droplet S is swelled up.

FIG. 6B is an explanatory drawing of the state of the droplet S when a high voltage is applied between electrodes (when a strong electric field is generated between electrodes). As shown in FIG. 6B, Coulomb force acts on the apex of the droplet S, so the droplet S has a shape for which the apex is suctioned to the upper electrode 11 side. Because of that, compared to the droplet S of FIG. 6A, the apex of the droplet S of FIG. 6B is positioned to the upper side, and the length of the droplet S in the vertical direction is longer (droplet S become higher).

FIG. 6C is an explanatory drawing of the state of the droplet S when the application of the high voltage is cancelled (or when the applied voltage is rapidly reduced). At this time, the part suctioned to the upper side (see FIG. 6B) is lowered by gravity, and the droplet S has a shape for which the apex is in a subducted shape. Because of this, compared to the droplet S of FIG. 6A, the apex of the droplet S of FIG. 6C is positioned to the lower side, and the length of the droplet S in the vertical direction becomes shorter (the droplet S is lower).

When a high voltage is applied between the electrodes, the droplet S has the kind of shape shown in FIG. 6B, and when the application of the high voltage is cancelled, the droplet S has the kind of shape shown in FIG. 6C. Because of this, when the rectangular wave of a prescribed frequency is applied to the lower electrode 12, the droplet S has the shape alternately changed between the shape in FIG. 6B and the shape in FIG. 6C, and is oscillated.

By oscillating the droplet S, the droplet S is stirred. By doing this, compared to when the droplet S is left still, it is possible to promote a reaction. In this way, the droplet oscillation device 1 can be used as a stirring device.

With the droplet oscillation device 1 and the droplet oscillation method using this, when the droplet S is a reagent including an antibody, it is preferable that the polarity of the potential applied to the lower electrode 12 be minus. In specific terms, the antibody has a charge, but its polarity depends on the pH of the solvent for the droplet S. The pH value of the solvent at which the polarity of the antibody changes is called the isoelectric point, and if the pH of the solvent is smaller than the isoelectric point, the antibody is charged to plus (positive polarity). If the pH of the solvent is larger than the isoelectric point, the antibody is charged to minus. The pH value of the solvent used with an immunohistostaining or ELISA step is typically around 6.8 to 8.0, so the antibody is charged to minus (negative polarity).

The dyeing density with immunohistostaining, and the coloring strength with ELISA are dependent on the amount of antigen-antibody reaction, but for the reaction, a negative control (inputting a specimen that does not have an antigen or antibody) is preferable. The reason for this is so as to be able to determine whether the results obtained after testing are due to an antigen-antibody reaction, or due to a non-specific reaction other than an antigen-antibody reaction. On the other hand, when a negative control is introduced, when the polarity of the potential given to the lower electrode 12 is plus (positive polarity), due to the attraction force between the lower electrode 12 and the antibody, there is the risk of there being an increase in the non-specific reaction noted above. If the polarity of the potential given to the lower electrode 12 is minus (negative polarity), because a repulsive force works between the lower electrode 12 and the antibody, it is thought that it is more difficult for the non-specific reaction noted above to occur. In other words, with immunohistostaining or ELISA with a negative control introduced, the non-specific reaction is inhibited, and it is possible to obtain more correct test results.

Condition Search Process

To promote stirring of the droplet S (e.g. a reagent), it is preferable to make the amplitude of the droplet S large. However, oscillation of the droplet S is changed by various factors (droplet S viscosity, appropriate volume of liquid, surface tension, temperature, droplet S size, and the like), so it is necessary to find the optimal conditions (rectangular wave frequency, distance between electrodes) for making the amplitude of the droplet S large.

Figure 7A:
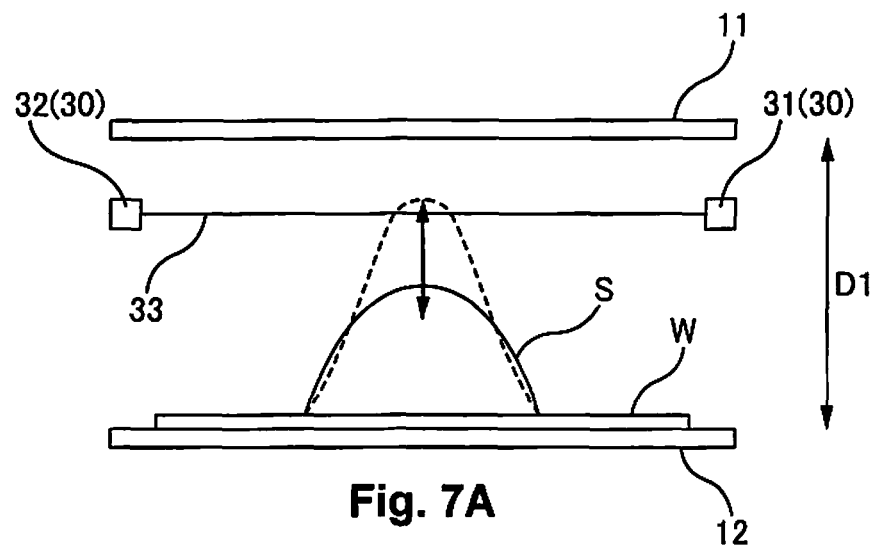
FIG. 7A and FIG. 7B are summary explanatory drawings of the method for searching for conditions with a large amplitude.
Figure 7B:
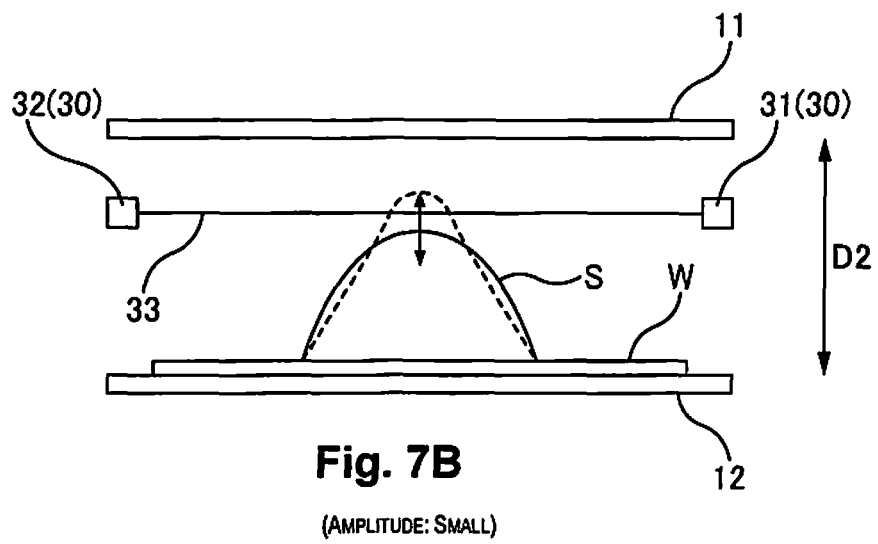

FIG. 7A and FIG. 7B are summary explanatory drawings of the method for searching for conditions for a large amplitude of the droplet S. The length of the arrow of the apex of the droplet S in the drawings shows the amplitude of the droplet S. The amplitude of the droplet S shown in FIG. 7A is larger than the amplitude of the droplet S shown in FIG. 7B.

When the amplitude of the droplet S is large, as shown in FIG. 7A, even if the distance between electrodes D1 (or the distance between the area sensor 30 detection area and the lower electrode 12) is large, the droplet S reaches the detection area. On the other hand, when the amplitude of the droplet S is small, if the distance between electrodes D2 is not smaller than the distance between electrodes D1, the droplet S does not reach the detection area. Using this fact, with the condition search process hereafter, by searching for the distance between electrodes D for which it is possible for the droplet S to reach the detection area while oscillating the droplet S on the substrate W, the optimal conditions for making the amplitude of the droplet S larger is found.

Figure 8:
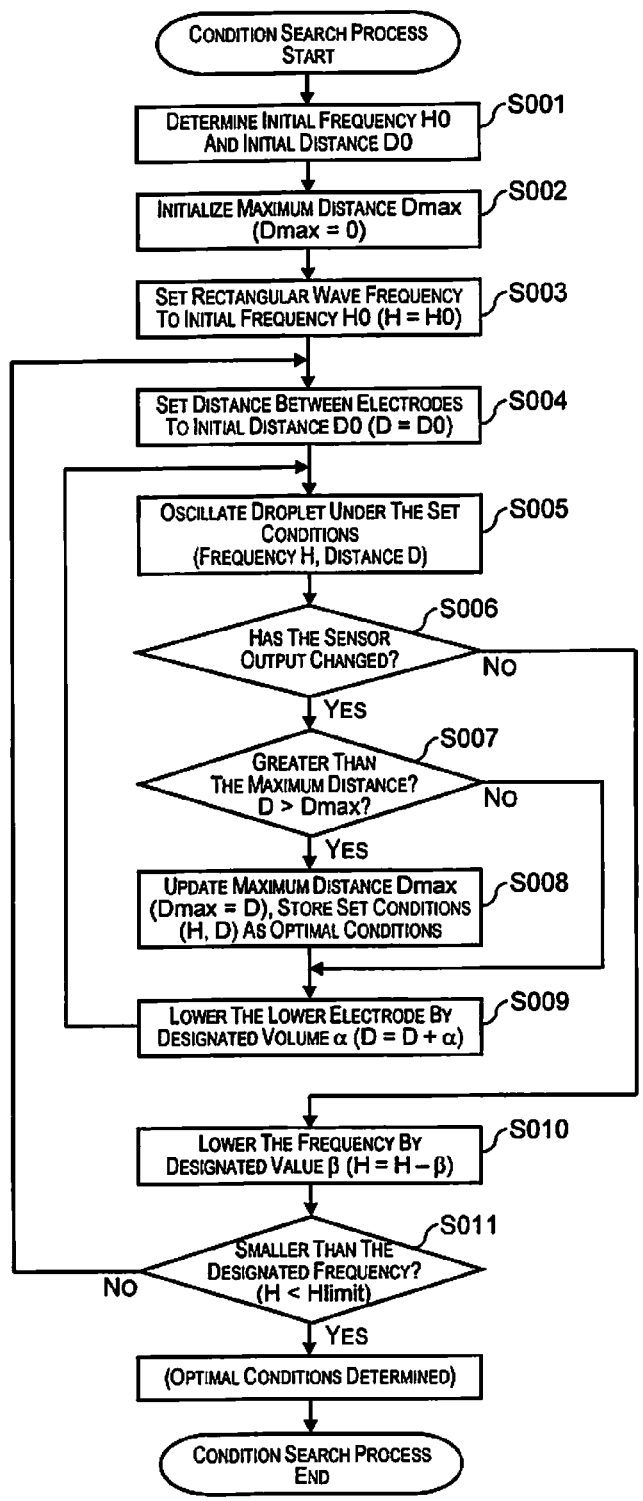
FIG. 8 is a flow chart of the condition search process of the first embodiment.

FIG. 8 is a flow chart of the condition search process of the first embodiment. The controller 40 controls each constitution element of the droplet oscillation device 1 (e.g. elevator mechanism 21, power supply device 22 and the like) to realize this condition search process.

First, based on the liquid volume input by the operator from the control panel 24, the controller 40 determines the initial frequency H0 which is the initial frequency of the rectangular wave frequency H, and the initial distance D0 which is the initial value of the distance between electrodes D (S001). Here, for example, the initial frequency H0 is 20 Hz and the initial distance D0 is 6.0 mm.

A table that correlates the liquid volume with the initial frequency H0 and the initial distance D0 can also be stored in advance in the memory 42 of the controller 40. With this table, the higher the liquid volume, the lower the initial frequency H0 is set. This is because the greater the liquid volume, the lower the natural oscillation frequency of the droplet S. Also, the higher the liquid volume, the longer the initial distance D0 is set. This is because the greater the liquid volume, the higher the height of the droplet S formed on the substrate W, and the initial distance D0 needs to be made longer so as not to have the droplet S contact the upper electrode 11.

Next, the controller 40 initializes maximum distance Dmax (S002). As is described later, the maximum distance Dmax is updated to the maximum distance between electrodes D when the droplet S reaches the detection area of the area sensor 30 during the condition search process. In this case, the value of the initialized maximum distance Dmax is "0." The initialization value is not limited to being "0," and for example it is also possible to place the substrate Won which the droplet S of the lowest liquid volume is dropped on the lower electrode 12, and when the lower electrode 12 and the upper electrode 11 are arranged opposite each other, the minimum distance between electrodes D for which the apex of that droplet S does not contact the upper electrode 11 can also be set as the initialization value.

Next, the controller 40 sets the frequency H of the applied voltage (rectangular wave) of the power supply device 22 to the initial frequency H0 (S003), controls the elevator mechanism 21 so that the distance between electrodes D is the initial distance D0, and sets the distance between electrodes D (S004).

Next, the controller 40 oscillates the droplet S at the initial setting conditions (initial frequency H0, initial distance D0) (S005). In specific terms, the controller 40 sets the applied voltage frequency H to 20 Hz (=H0), sets the distance between electrodes D to 6.0 mm (=D0), and oscillates the droplet S. Next, the controller 40 determines whether or not the output of the area sensor has changed (S006). The droplet S is oscillated, and when the state of the droplet S apex reaching the detection area of the area sensor 30 and the state of not reaching it is repeated, the output of the area sensor 30 changes. In contrast to this, if the apex does not reach the detection area of the area sensor 30 even when the droplet S is oscillated, the output of the area sensor 30 does not change. With the initial setting conditions, the initial setting conditions of the table are set in advance so that the output of the area sensor 30 changes. Because of this, the determination at the first S006 is Yes.

Next, the controller 40 determines whether or not the distance between electrodes D is greater than the maximum distance Dmax up to now (S007). The determination of the first S007 has the maximum distance Dmax as is as initialized at S002, so is Yes.

When Yes at S007, the controller 40 updates the maximum distance Dmax to the current distance between electrodes D, also stores the current setting conditions (frequency H, distance between electrodes D) as the optimal conditions (S008), and proceeds to the next S009. When No at S007, the processing of S008 is not performed, and the process advances to S009. Then, at S009, the controller 40 controls the elevator mechanism 21, and lowers the lower electrode 12 by a prescribed volume a. Here, a is set to 0.2 mm, and the controller 40 sets the distance between electrodes D from 6.0 mm to 6.2 mm.

Also, the controller 40, while keeping the applied voltage frequency H at the initial frequency 20 Hz (=H0), expands the distance between electrodes D 0.2 mm (=α) at a time until the output of the area sensor 30 no longer changes, stores the setting conditions when the maximum distance Dmax is updated, and repeats this (S005 to S009).

As the distance between electrodes D expands, the apex of the droplet S no longer reaches the detection area of the area sensor 30 (No at S006). In this case, the controller 40 lowers the frequency H of the applied voltage (rectangular wave) of the power supply device 22 by a prescribed value β (S010). Here, β is set to 1 Hz, and the controller 40 sets the frequency H of the applied voltage of the power supply device 22 from 20 Hz to 19 Hz. The determination of the first S011 is No, and the controller 40 returns the distance between electrodes D to the initial distance D0 6.0 mm (S004).

Next, while keeping the applied voltage frequency H at 19 Hz, the controller 40 expands the distance between electrodes D by 0.2 mm at a time from 6.0 mm until the output of the area sensor 30 changes, stores the set conditions when the maximum distance Dmax is updated, and repeats this (S005 to S009). Then, the controller 40 lowers the frequency H of the applied voltage of the power supply device 22 by 1 Hz at a time each time S006 is No, and repeats the process of S004 to S009 until the frequency H reaches a prescribed frequency H limit. When the frequency H has lowered more than the prescribed frequency H limit (Yes at S011), the set conditions stored last at S008 (frequency H, distance between electrodes D) are set as the optimal conditions, and the condition search process is ended.

The prescribed frequency H limit is a value of at least 1 Hz or greater, and for example is the minimum frequency H value for which the droplet S starts oscillating when an electric field is given to the droplet S dropped onto the substrate W.

With the condition search process of the first embodiment noted above, the controller 40 determines whether or not the droplet S reaches the detection area with a plurality of conditions for which the applied voltage frequency H and the distance between electrodes D differ (S005, S006). Then, the optimal condition obtained with the condition search process (frequency H, distance between electrodes D) becomes the condition for which the distance between electrodes D is the largest among the conditions for which the droplet S reaches the detection area of the area sensor 30.

Also, with the condition search process of the first embodiment, by gradually changing the distance between electrodes while keeping the applied voltage frequency H, a determination is made of whether or not the droplet S reaches the detection area under a plurality of conditions. Because of that, it is possible to reduce the number of changes of the frequency H of the applied voltage. To determine with good precision whether or not the droplet S reaches the detection area immediately after the frequency H of the applied voltage has changed, wait time is required until the residual oscillation of the droplet S oscillating at the immediately prior frequency H has stopped, so if the number of changes of the frequency H of the applied voltage is reduced, it is possible to reduce this wait time.

Also, with the condition search process of the first embodiment, when it has gone from a state when the droplet S reaches the detection area of the area sensor 30 to a state when it does not reach it (when No at S006), the controller 40 changes the frequency H of the applied voltage (S010). Because of this, compared to when the droplet S is oscillated under all the conditions in the range of a prescribed distance as with the second embodiment described later, it is possible to reduce the number of conditions, and possible to shorten the time for the condition search process.

After the aforementioned condition search process, the controller 40 oscillates the droplet S at the optimal condition frequency H and distance between electrodes D. By doing this, the droplet oscillation device 1 can oscillate the droplet S at the condition for which the amplitude is greatest.

Modification Example of the First Embodiment

Figure 9:
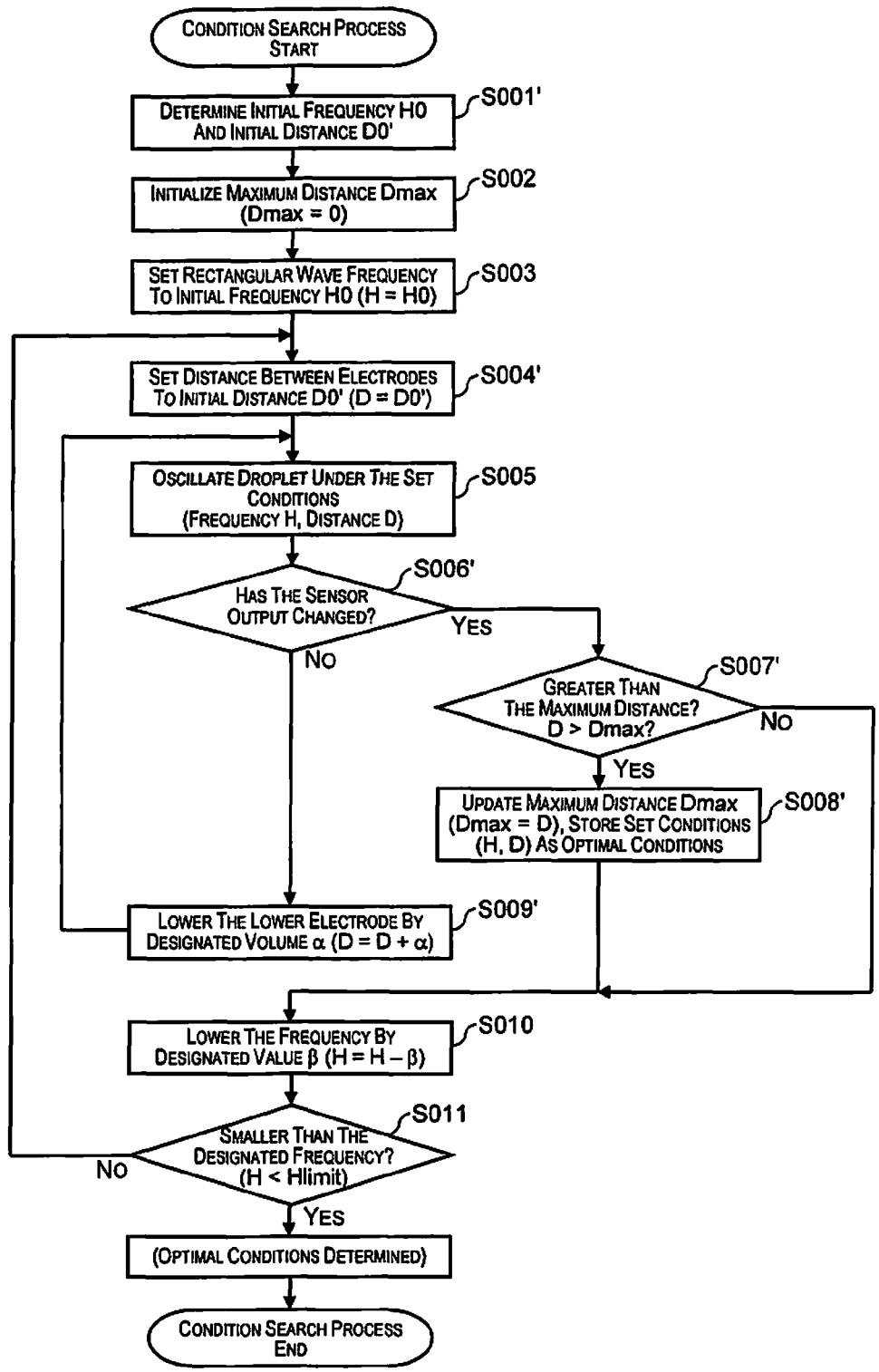
FIG. 9 is a flow chart of a modification example of the condition search process of the first embodiment.

FIG. 9 is a flow chart of a modification example of the condition search process of the first embodiment. With this modification example, the processes of S001 and S004 to S009 of the condition search process in FIG. 8 described previously are changed. With the condition search process in FIG. 8 described previously, the distance between electrodes D was gradually expanded while keeping the applied voltage frequency H, but with this modification example, the distance between electrodes is gradually narrowed.

First, based on the liquid volume input by the operator from the control panel 24, the controller 40 determines the initial frequency H0 which is the initial frequency of the rectangular wave frequency H, and the initial distance D0' which is the initial value of the distance between electrodes D (S001'). With the initial setting conditions of the modification example, the table initial setting conditions are set in advance so that the droplet S does not reach the detection area of the area sensor 30 even when the droplet S is oscillated (in contrast to this, with the condition search process of FIG. 8 described previously, the table initial setting conditions were set in advance so that the output of the area sensor 30 changed with the initially set conditions).

Next, the controller 40 initializes the maximum distance Dmax (S002), sets the frequency H of the applied voltage (rectangular wave) of the power supply device 22 to the initial frequency H0 (S003), and controls the elevator mechanism 21 to set the distance between electrodes D so that the distance between electrodes D is the initial distance D0' (S004'). These processes are almost the same as the condition search process of FIG. 8 described previously. The value of the initialized maximum distance Dmax is "0."

Next, the controller 40 oscillates the droplet S under the initially set conditions (S005), and determines whether or not the output of the area sensor 30 changes (S006'). With the initially set conditions, the table initial setting conditions (initial distance D0') are set in advance so that the output of the area sensor 30 does not change, so the determination of the first S006' is No, and the controller 40 controls the elevator mechanism 21 to raise the lower electrode 12 by a prescribed volume a, and narrows the distance between electrodes D (S009'). Then, the controller 40 gradually raises the lower electrode 12 until the output of the area sensor 30 changes (until the apex of the oscillating droplet S reaches the detection area). When the lower electrode 12 is gradually raised, the apex of the oscillating droplet S reaches the detection area, and the output of the area sensor 30 changes (Yes at S006').

Next, the controller 40 determines whether or not the distance between electrodes D is greater than the maximum distance Dmax up to now (S007'). The determination of the first S007' is Yes with the maximum distance Dmax left as is as initialized at S002.

When Yes at S007', the controller 40 updates the maximum distance Dmax to the current distance between electrodes D, and stores the current set conditions (frequency H, distance between electrodes D) as the optimal conditions (S008'), and then advances to the next S010. When No at S007', the process of S008' is not performed, and the process advances to S010. Then, the controller 40 lowers the frequency H of the applied voltage (rectangular wave) of the power supply device 22 by a prescribed value β (S010).

Next, the controller 40 returns the distance between electrodes D to the initial distance D (S004'), and while keeping the frequency H after changing at S010, gradually raises the lower electrode 12 to gradually narrow the distance between electrodes D until the output of the area sensor 30 changes (until the apex of the oscillating droplet S reaches the detection area), and each time the output of the area sensor 30 changes (Yes at S006'), if the maximum distance Dmax is updated, stores the set conditions, and this is repeated (S005 to S009'). Then, each time the output of the area sensor 30 changes (Yes at S006'), the controller 40 gradually lowers the frequency H of the applied voltage of the power supply device 22, and repeats the process of S004' to S009' until the frequency H reaches the prescribed frequency Hlimit. When the frequency H drops lower than the prescribed frequency Hlimit (Yes at S011), the set conditions stored last at S008' (frequency H, distance between electrodes D) are set as the optimal conditions, and the condition search process is ended.

With this modification example as well, the controller 40 determines whether or not the droplet S reaches the detection area under a plurality of conditions for which the applied voltage frequency H and the distance between electrodes D differ (S005, S006'). Then, the optimal conditions found with the condition search process (frequency H, distance between electrodes D) become the conditions for which the distance between electrodes D is the greatest among the conditions for which the droplet S reached the detection area of the area sensor 30. With the condition search process of FIG. 8 described previously, the distance between electrodes D was gradually expanded while keeping the frequency H of the applied voltage, but as with this modification example, it is also possible to gradually narrow the distance between electrodes D.

Also, with this modification example as well, the controller 40 determines whether or not the droplet S reached the detection area under a plurality of conditions by gradually changing the distance between electrodes D while keeping the frequency H of the applied voltage. Because of this, it is possible to reduce the number of changes of the frequency H of the applied voltage, so it is possible to reduce the wait time until the residual oscillation of the droplet S stops.

Also, with the modification example, when changing from the state for which the droplet S does not reach the detection area of the area sensor to the state when it does reach it (when Yes at S006'), the controller 40 changes the frequency H of the applied voltage (S010). Because of this, compared to when the droplet S is oscillated under all the conditions in a prescribed distance range as with the second embodiment, it is possible to reduce the number of conditions, and possible to shorten the time for the condition search process.

Second Embodiment

Figure 10:
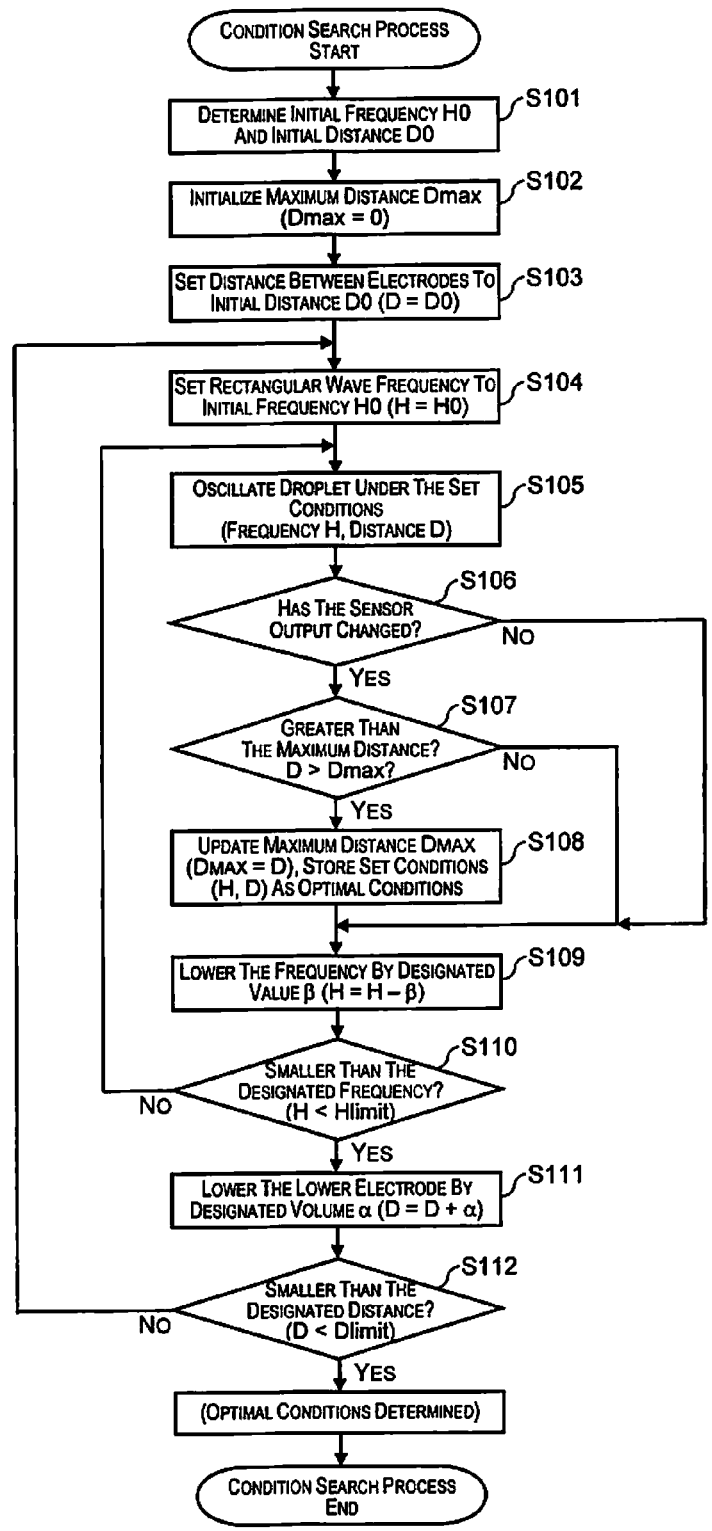
FIG. 10 is a flow chart of the condition search process of the second embodiment.

FIG. 10 is a flow chart of the condition search process of the second embodiment. With the first embodiment described previously, the distance between electrodes D was gradually changed while keeping the frequency H of the applied voltage, but with the second embodiment, the frequency H is gradually changed while keeping the distance between electrodes D.

First, based on the liquid volume input by the operator from the control panel 24, the controller 40 determines the initial frequency H0 which is the initial value of the frequency H of the rectangular wave, and the initial distance D0 which is the initial value of the distance between electrodes D (S101), and initializes the maximum distance Dmax (S102). These processes are the same as the condition search process of the first embodiment. The initialized maximum distance Dmax value is "0."

Next, the controller 40 controls the elevator mechanism 21 so that the distance between electrodes D is the initial distance D0 and sets the distance between electrodes D (S103). This process of S103 is the same as S004 of the first embodiment. Next, the controller 40 sets the frequency H of the applied voltage (rectangular wave) of the power supply device 22 to the initial frequency H0 (S104). This process of S104 is the same as S003 of the first embodiment.

Next, the controller 40 oscillates the droplet S at the initially set conditions (initial frequency H0, initial distance D0) (S105), and determines whether or not the output of the area sensor 30 changes (S106). If the output of the area sensor 30 changes (Yes at S106), the controller 40 determines whether or not the distance between electrodes D is greater than the maximum distance Dmax up to now (S107). The determination of the first S107 is with the maximum distance Dmax left as is as initialized at S102, so this is Yes. When Yes at S107, the controller 40 updates the maximum distance Dmax to the current distance between electrodes D, and also stores the current set conditions (frequency H, distance between electrodes D) as the optimal conditions (S108), and then advances to the next S109. When No at S106, or when No at S107, the process of S108 is not performed, and the process advances to S109. Then, at S109, the controller 40 lowers the frequency H of the applied voltage (rectangular wave) of the power supply device 22 by a prescribed value β (S109). Then, the controller 40 gradually lowers the frequency H while keeping the distance between electrodes D during the time until the frequency H reaches the prescribed frequency Hlimit, stores the set conditions when the maximum distance Dmax is updated, and this is repeated (S105 to S110).

If the frequency H goes below the prescribed Hlimit (Yes at S110), the controller 40 controls the elevator mechanism 21, lowers the lower electrode 12 by a prescribed volume α, and changes the distance between electrodes D. Then, the controller 40 returns the frequency H of the applied voltage (rectangular wave) of the power supply device 22 again to the initial frequency H0 (S104). Then, while keeping the distance between electrodes D after changing, the frequency H is again gradually lowered, the set conditions when the maximum distance Dmax is updated are stored, and this is repeated (S105 to S110). Each time it is Yes at S110, the controller 40 lowers the lower electrode 12 by the prescribed volume a, and until the distance between electrodes D reaches the prescribed distance Dlimit, the process of S104 to S112 is repeated. If the distance between electrodes D goes below the prescribed distance Dlimit (Yes at S112), the set conditions stored last at S108 (frequency H, distance between electrodes D) are set as the optimal conditions, and the condition search process is ended.

The prescribed distance Dlimit of the distance between electrodes D is for example the value of the distance between electrodes D at which it is no longer possible to give sufficient oscillation to the droplet S of the maximum liquid volume.

With the second embodiment as well, the controller 40 determines whether or not the droplet S reaches the detection area under a plurality of conditions for which the applied voltage frequency H and the distance between electrodes D differs (S105, S106). Then, the optimal conditions (frequency H, distance between electrodes D) obtained with the condition search process become the conditions for which the distance between electrodes D is the greatest among the conditions for which the droplet S reaches the detection area of the area sensor 30.

However, with the second embodiment, by changing the frequency H of the applied voltage while keeping the distance between electrodes D, a determination is made of whether the droplet S reaches the detection area under a plurality of conditions. Because of this, with the second embodiment, it is possible to reduce the number of times the distance between electrodes D is changed. When the operation of the elevator mechanism 21 is slow, and it takes time to change the distance between electrodes D, the second embodiment is more advantageous than the first embodiment.

With the condition search process of the second embodiment as well, as with the modification example of the first embodiment, instead of gradually expanding the distance between electrodes D, it is also possible to gradually narrow the distance between electrodes D.

Third Embodiment

Figure 11:
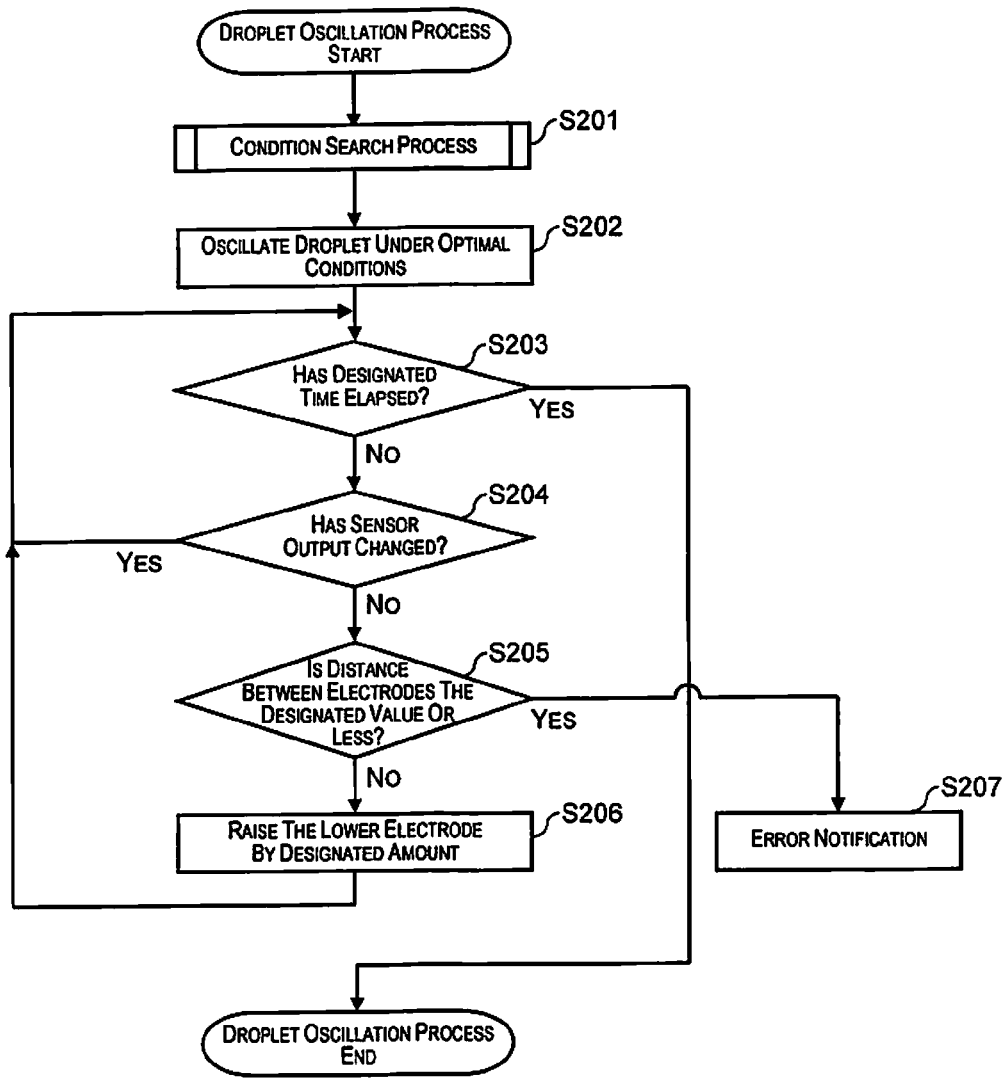
FIG. 11 is a flow chart of the droplet oscillation process of the third embodiment.

FIG. 11 is a flow chart of the droplet oscillation process of the third embodiment. With the embodiments described previously, after the condition search process, the droplet oscillation device 1 oscillated the droplet S under the optimal conditions. However, while the droplet S is being oscillated, the oscillation of the droplet S changes due to evaporation of moisture or changes in the contact surface area between the droplet S and the substrate W or the like. In light of that, with the third embodiment, while the droplet S is oscillating under the optimal conditions obtained with the condition search process, changes in the oscillation of the droplet S are detected.

First, the controller 40 executes the previously described condition search process (any of FIG. 8 through FIG. 10) and acquires the optimal conditions (S201), and oscillates the droplet S at the frequency H and distance between electrodes D of those optimal conditions (S202). Then, when a prescribed time has elapsed (Yes at S203), the controller 40 ends the droplet oscillation process.

On the other hand, before a prescribed time has elapsed (No at S203), there are cases when the moisture of the droplet S evaporates or the contact surface area between the droplet S and the substrate W expands. In this case, the droplet S may become smaller, or the amplitude of the droplet S may become smaller, so even if the droplet S is oscillated, the apex of the droplet S no longer reaches the detection area of the area sensor 30.

In light of that, until the prescribed time has elapsed, the controller 40 determines whether or not the output of the area sensor 30 has changed (S204). Then, when the output of the area sensor 30 has not changed (No at S204), if the distance between electrodes D is not a prescribed value or lower (No at S205), the controller 40 narrows the distance between electrodes D by raising the lower electrode 12 a prescribed volume (S206), and continues the droplet oscillation process until the prescribed time has elapsed.

When the output of the area sensor 30 has not changed (No at S204), if the distance between electrodes D is already the prescribed value or lower, the controller 40 determines that there is an abnormality in the change in the droplet S oscillation, and gives notification of an error (S207).

The prescribed value of the distance between electrodes D in this case is for example a value of the distance between electrodes D for which it is predicted there may be a risk of the droplet S contacting the upper electrode 11 due to oscillation of the droplet S.

Modification Example of the Third Embodiment

Figure 12:
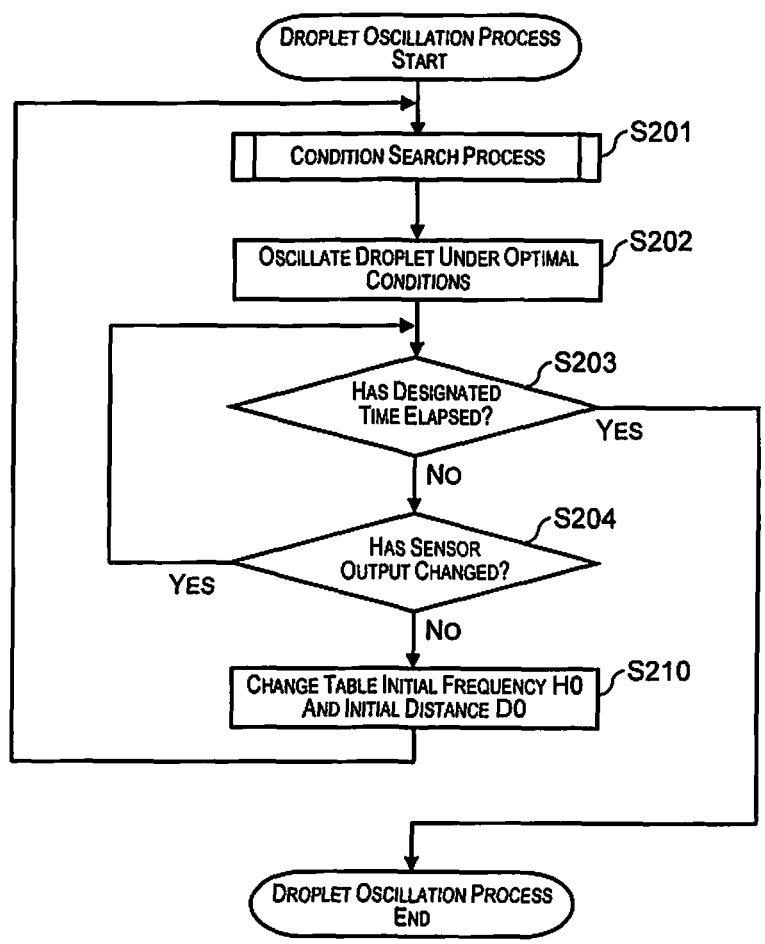
FIG. 12 is a flow chart of a modification example of the droplet oscillation process of the third embodiment.

FIG. 12 is a flow chart of a modification example of the droplet oscillation process of the third embodiment. With the droplet oscillation process of FIG. 11 described previously, while the droplet S is being oscillated with the optimal conditions obtained with the condition search process, if the output of the area sensor 30 does not change, the distance between electrodes D was narrowed and the droplet oscillation process continued. In contrast to this, with this modification example, while the droplet S is being oscillated under the optimal conditions obtained with the condition search process, if the output of the area sensor does not change (No at S204), after changing the initial frequency H0 and the initial distance D0 of the table stored in the memory 42 (S210), the condition search process is performed again (S201). With this modification example, even when the natural oscillation frequency of the droplet S is changed, it is possible to make the amplitude of the droplet S as big as possible.

The reason that the area sensor 30 cannot detect the droplet S even when the droplet S is oscillated at the optimal conditions is thought to possibly be because the liquid volume is low due to evaporation of the solvent from the droplet S, for example. The smaller the liquid volume, the higher (greater) the frequency H of the electric field that oscillates the droplet S has to be in light of the natural oscillation frequency. On the other hand, the smaller the liquid volume of the droplet S, the smaller the distance between electrodes D needs to be. Specifically, while the droplet S is being oscillated, if the output of the area sensor 30 does not change, the value of the initial frequency H0 is made higher (greater), and the value of the initial distance D0 is changed to be smaller.

With the modification example as well, it is possible to perform the error notification process (S205, S207) as with the droplet oscillation process of FIG. 11 described previously.

Fourth Embodiment

FIG. 13A and FIG. 13B are summary explanatory drawings of the condition search method of the fourth embodiment. The top section of each drawing shows the state seen from above, and the bottom section shows the state seen from the left side.

With the fourth embodiment, when the droplet S is still (before the droplet S is oscillated), the apex of the droplet S is in a state lower than the detection area of the area sensor 30. Also, when the droplet S is oscillated and the apex of the droplet S is suctioned to the upper electrode 11 side, the apex of the droplet S reaches the detection area of the area sensor 30. Said another way, with the fourth embodiment, the distance between electrodes D between the upper electrode 11 and the lower electrode 12 is set so that the detection area of the area sensor 30 is higher than the apex of the droplet S when still.

The diagonal cross hatching area of the top section shows the area of the droplet S higher than the detection area of the area sensor 30 when, when the droplet S is oscillated, the apex of the droplet S is suctioned to the direction of the upper electrode 11 (area for which the droplet S reaches the detection area). In other words, the diagonal cross hatched area shows the area for which the droplet S blocks the detected light 34 when the droplet S is oscillated and the apex of the droplet S is suctioned to the upper electrode 11 side. The length of the arrow of the apex of the droplet S in the lower section shows the amplitude of the droplet S. Here, the amplitude of the droplet S shown in FIG. 13A is greater than the amplitude of the droplet S of FIG. 13B.

When the amplitude of the droplet S is large, as shown in the top section of FIG. 13A, the diagonal cross hatched area is larger. On the other hand, when the amplitude of the droplet S is small, as shown in the top section of FIG. 13B, the diagonal cross hatched area is smaller. In other words, this is because the larger the amplitude of the droplet S, the more liquid is suctioned in the direction of the upper electrode 11, and the more liquid reaches the detection area of the area sensor 30.

As a result, the droplet S with the larger amplitude is in a state with less received light volume of the light receiving unit 32 of the area sensor 30 compared to the droplet S with the smaller amplitude (see the top section of FIG. 13A). Using this fact, with the condition search process hereafter, while oscillating the droplet S on the substrate W, by obtaining the conditions for which the received light volume of the light receiving unit 32 becomes the lowest based on the output of the area sensor 30, the optimal conditions for increasing the amplitude of the droplet S are obtained.

With the fourth embodiment, the apex of the droplet S when still is in a state lower than the detection area of the area sensor 30. In this state, regardless of the conditions for oscillating the droplet S, the received light volume of the light receiving unit 32 of the area sensor 30 is in its highest state. Because of this, with the fourth embodiment, by searching for the conditions for which the change amount of the output value of the area sensor 30 is greatest, a search is done for the conditions for which the received light volume of the light receiving unit 32 is the lowest (specifically, the conditions that make the amplitude of the droplet S larger).

Figure 14:
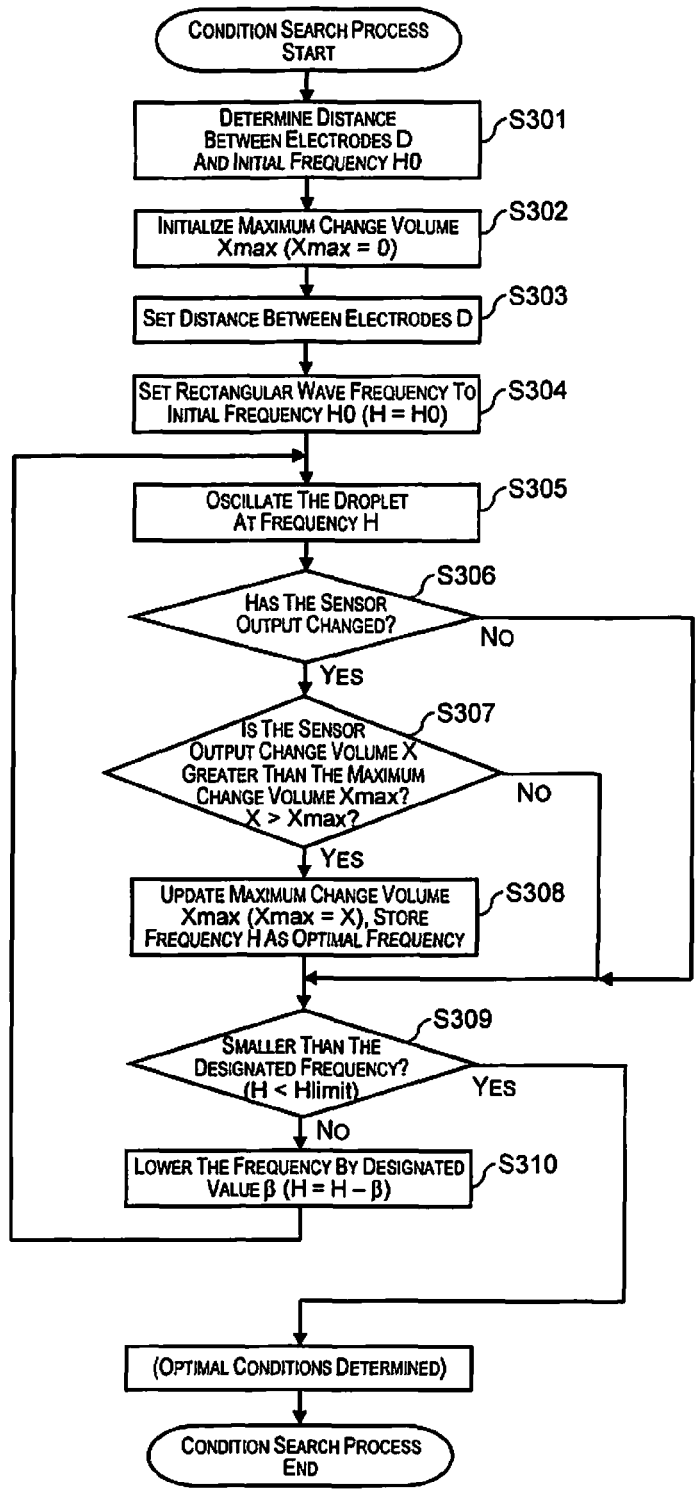
FIG. 14 is a flow chart of the condition search process of the fourth embodiment.

FIG. 14 is a flow chart of the condition search process of the fourth embodiment. The controller 40 controls each constitutional element of the droplet oscillation device 1 (e.g. the elevator mechanism 21, the power supply device 22 and the like), and realizes this condition search process.

First, based on the liquid volume input by the operator from the control panel 24, the controller 40 determines the distance between electrodes D and the initial frequency H0 (S301). Here, for example, the initial frequency H0 is 20 Hz, and the distance between electrodes D is 6.0 mm.

The table with which the liquid volume and the distance between electrodes D are correlated can also be stored in advance in the memory 42 of the controller 40. In this table, the larger the amount of liquid, the longer the distance between electrodes D is set. The reason for that is that the more liquid volume there is, the higher the droplet S height is, and the longer it is necessary to make the distance between electrodes D so as not to have the droplet S contact the upper electrode 11. With the fourth embodiment, as shown in FIG. 13A and FIG. 13B, the distance between electrodes D is set in the table so that the detection area of the area sensor 30 is higher than the apex when the droplet S is still and is lower than the apex when it is being oscillated.

Next, the controller 40 initializes the maximum change amount Xmax (S302). As is described later, the maximum change amount Xmax is updated to the maximum value of the change amount of the output of the area sensor 30 during the condition search process. In this case, the value of the initialized maximum change amount Xmax is "0." The initialization value is not limited to being "0."

Next, the controller 40 controls the elevator mechanism 21 and sets the distance between electrodes D (S303), and sets the frequency H of the applied voltage (rectangular wave) of the power supply device 22 to the initial frequency H0 (S304).

Next, the controller 40 oscillates the droplet S at the set frequency H (S305). Initially, the controller 40 sets the applied voltage frequency H to 20 Hz (=H0) which is the initial frequency and oscillates the droplet S. Next, the controller 40 determines whether or not the output of the area sensor 30 has changed (S306). The table initial frequency H0 is set in advance so that the output of the area sensor 30 will change at the initial frequency H0. Because of that, the determination of the first S306 is Yes.

Next, the controller 40 determines whether or not the change amount X of the output of the area sensor 30 is greater than the maximum change amount Xmax stored up to now (S307). With the fourth embodiment, the change amount X of the output of the area sensor 30 is the difference (absolute value) between the output value of the light receiving unit 32 when the received light volume is lowest and the output value of the light receiving unit 32 when the received light volume is highest.

The determination of the first S307 is Yes because the maximum change amount Xmax is left as is as initialized at S302. When Yes at S307, the controller 40 updates the maximum change amount Xmax to the current change amount X of the output of the area sensor 30, and stores the currently set frequency H as the optimal frequency (S308), and then advances to the next S309. When No at S307, the process advances to S309 without performing the process of S308.

Then, if the set frequency H has not reached the prescribed frequency Hlimit (No at S309), the controller 40 lowers the frequency H by a prescribed value β (S310). Here, β is set to 1 Hz. The determination of the first S309 is No, and the controller 40 sets the set frequency H of the applied voltage of the power supply device 22 from 20 Hz to 19 Hz.

The prescribed frequency Hlimit is a value of at least 1 Hz or greater, and for example is a value of the minimum frequency H at which the electric field is given to the droplet S dropped on the substrate W for which the droplet S starts oscillating.

In this way, the controller 40 lowers the frequency H of the applied voltage 1 Hz at a time, stores the frequency H when the maximum change amount Xmax of the output of the area sensor 30 is updated, and repeats this (S305 to S310). Then, when the frequency H is lowered more than the prescribed frequency Hlimit (Yes at S309), the frequency H stored last at S308 is used as the optimal frequency, and the condition search process ends.

With the fourth embodiment noted above, the controller 40 oscillates the droplet S under a plurality of conditions with different applied voltage frequency H, and uses the frequency H for which the change amount X of the area sensor 30 output is greatest as the optimal frequency. Then, after the aforementioned condition search process, the controller 40 oscillates the droplet S at the optimal frequency. By doing this, the droplet oscillation device 1 is able to oscillate the droplet S under the condition with a large amplitude.

Fifth Embodiment

FIG. 15A and FIG. 15B are summary explanatory drawings of the condition search method of the fifth embodiment. The top section of each drawing shows the state seen from above, and the bottom section shows the state seen from the left side. Here, the amplitude of the droplet S shown in FIG. 15A is larger than the amplitude of the droplet S of FIG. 15B.

With the fifth embodiment, when the droplet S is still (before the droplet S is oscillated), the apex of the droplet S is in a state higher than the detection area of the area sensor 30. With the fifth embodiment, the distance between electrodes D between the upper electrode 11 and the lower electrode 12 is set so that the apex of the droplet S when still is higher than the detection area of the area sensor 30.

The diagonal cross hatched area of the top section shows the area for which the apex of the droplet S when the droplet S is oscillated is suctioned to the direction of the upper electrode 11 and is higher than the detection area of the area sensor 30 (area in which the droplet S reaches the detection area). In other words, the diagonal cross hatched area shows the area for which the droplet S blocks the detected light 34 when the apex of the droplet S when the droplet S is oscillated is suctioned in the direction of the upper electrode 11.

When the amplitude of the droplet S is large, as shown in the top section of FIG. 15A, the diagonal cross hatched area becomes smaller. On the other hand, when the amplitude of the droplet S is small, as shown in the top section of FIG. 15B, the diagonal cross hatched area becomes larger. In other words, the larger the amplitude of the droplet S, the smaller the diagonal cross hatched area. This is because the larger the amplitude of the droplet S, the more liquid is suctioned higher than the detection area of the area sensor 30, and there is less liquid lower than the detection area of the area sensor 30.

As a result, the droplet S with the larger amplitude is in a state with a greater amount of received light volume of the light receiving unit 32 of the area sensor 30 than the droplet S with a small amplitude (see the top section of FIG. 15A). Using this fact, with the condition search process hereafter, by obtaining conditions for which the received light volume of the light receiving unit 32 is greatest based on the output of the area sensor 30 during oscillation of the droplet S, the optimal conditions for making the amplitude of the droplet S larger are obtained.

With the fifth embodiment, the output value of the area sensor 30 when the droplet S is still (normal value) is stored, and by searching for the conditions for which the difference (change amount) between this normal value and the output value of the area sensor 30 when the apex of the droplet S is suctioned in the direction of the upper electrode 11 is greatest, the condition by which the received light volume of the light receiving unit 32 will be the greatest (specifically, the conditions that will make the amplitude of the droplet S larger) is searched for.

Figure 16:
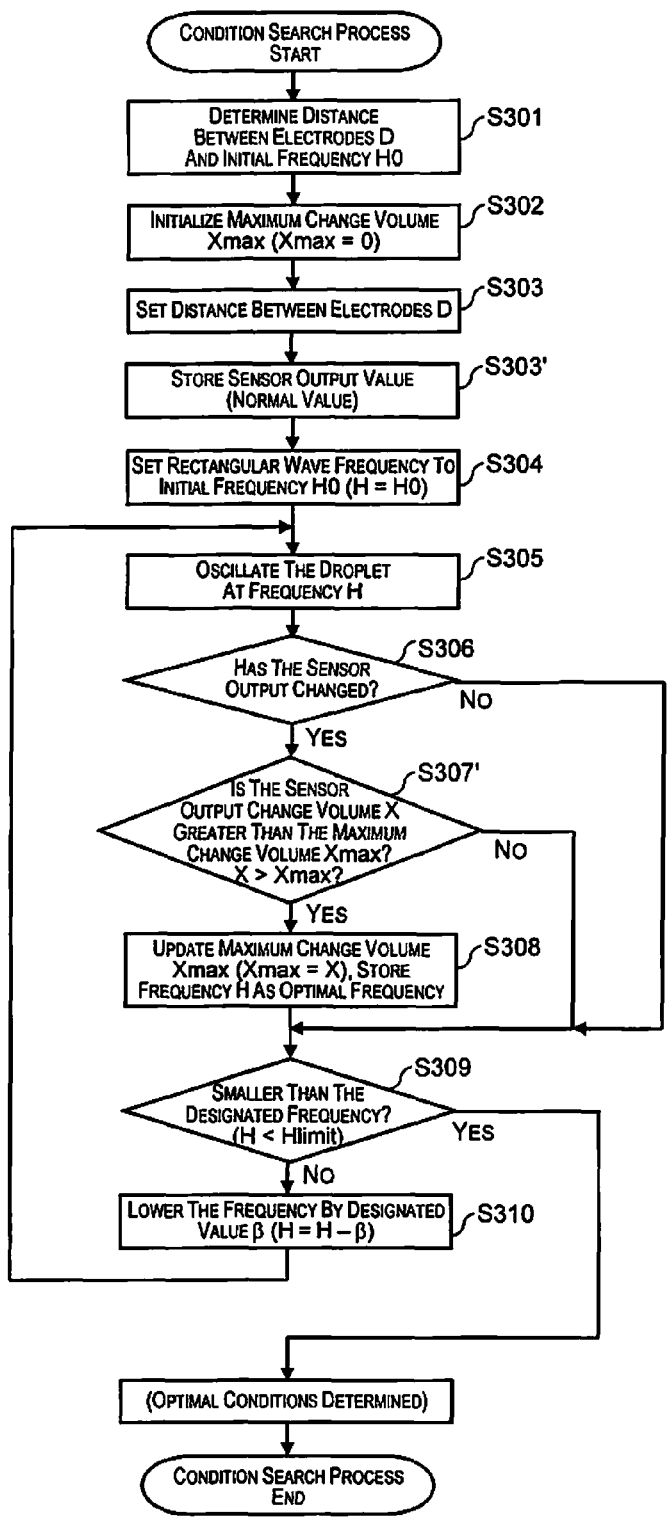
FIG. 16 is a flow chart of the condition search process of the fifth embodiment.

FIG. 16 is a flow chart of the condition search process of the fifth embodiment.

First, the controller 40 determines the distance between electrodes D and the initial frequency H0 based on the liquid volume input by the operator from the control panel 24 (S301). With the fifth embodiment, as shown in FIGS. 15A and 15B, the distance between electrodes D is determined in the table so that the detection area of the area sensor 30 is lower than the apex of the droplet S when still.

Next, the controller 40 initializes the maximum change amount Xmax (S302), and controls the elevator mechanism 21 to set the distance between electrodes D between the upper electrode 11 and the lower electrode 12 (S303). In this case as well, the initialization value of the maximum change amount Xmax is "0."

Next, before the droplet S is oscillated, the controller 40 stores the output value of the area sensor 30 when the droplet S is still (normal value) (S303'). The normal value stored at this time is used for calculating the change amount X at S307'.

Next, after setting the frequency H of the applied voltage (rectangular wave) of the power supply device 22 to the initial frequency H0 (S304), the controller 40 oscillates the droplet S at the frequency H (S305). Then, about the same as with the fourth embodiment, the controller 40 lowers the frequency H of the applied voltage by a prescribed value β 1 Hz) at a time, stores the frequency H when the maximum change amount Xmax of the output of the area sensor 30 is updated, and repeats this (S305 to S310). Then, when the frequency H is lower than the prescribed frequency Hlimit (Yes at S309), the frequency stored last at S308 is used as the optimal frequency, and the condition search process ends.

With the fifth embodiment, the calculation method of the change amount X differs from the fourth embodiment (S307'). With the fifth embodiment, the change amount X of the output of the area sensor 30 is the difference (absolute value) between the normal value stored at S303' and the output value of the area sensor 30 when the apex of the droplet S is suctioned in the direction of the upper electrode 11. The output value changes when the received light volume of the light receiving unit 32 of the area sensor 30 changes during oscillation of the droplet S, but among the changing output values, the output value showing that the received light volume is high is the output value of the area sensor 30 when the apex of the droplet S is suctioned in the direction of the upper electrode 11. In other words, with the fifth embodiment, the controller 40 calculates the difference between the normal value stored at S303' and the output value showing the greatest amount of received light volume among the output values that change during the oscillation of the droplet S, and the absolute value of that difference is the change amount X.

With the fifth embodiment noted above, the controller 40 oscillates the droplet S under a plurality of conditions for which the applied voltage frequency H differs, and uses the frequency H for which the change amount X of the output of the area sensor 30 is greatest as the optimal frequency. Then, after the aforementioned condition search process, the controller 40 oscillates the droplet S at the optimal frequency. By doing this, the droplet oscillation device 1 is able to oscillate the droplet S under the condition with a large amplitude (condition for which the apex of the droplet S is suctioned the most to the upper electrode 11).

Modification Example of the Fifth Embodiment

With the aforementioned fifth embodiment, the size of the amplitude of the droplet S is determined based on the output value of the area sensor 30 when the apex of the droplet S is suctioned in the direction of the upper electrode 11 as shown in FIG. 6B (see FIG. 15A and FIG. 15B). However, as shown in FIG. 6C, it is also possible to have the part suctioned to the upper side of the droplet S be dropped by gravity, and to determine the size of the amplitude of the droplet S based on the output value of the area sensor 30 when the apex of the droplet S is subducted.

FIG. 17A and FIG. 17B are summary explanatory drawings of the condition search method of a modification example of the fifth embodiment. Here, the amplitude of the droplet S shown in FIG. 17A is larger than the amplitude of the droplet S shown in FIG. 17B.

With the modification example as well, the same as with the fifth embodiment noted above, when the droplet S is still (before the droplet S is oscillated), the apex of the droplet S is in a state already reaching the detection area of the area sensor 30 (this is how the distance between electrodes D is set).

The diagonal cross hatched area of the top section shows the area for which when the part suctioned to the upper side of the droplet S is dropped by gravity and the apex of the droplet S is subducted, the droplet S is higher than the detection area of the area sensor 30 (area for which the droplet S reaches the detection area). In other words, the diagonal cross hatched area shows the area for which when the part suctioned to the upper side of the droplet S is dropped by gravity and the apex of the droplet S is subducted, the droplet S blocks the detected light 34.

As can be understood by comparing the top sections of FIG. 17A and FIG. 17B, the droplet S with the larger amplitude has a larger diagonal cross hatched area. This is because the droplet S with the larger amplitude has the apex of the droplet S subducted, and the droplet S expands horizontally.

As a result, the droplet S with the larger amplitude is in a state with a lower received light volume of the light receiving unit 32 of the area sensor 30 than the droplet S with the smaller amplitude (see top section of FIG. 17A). Using this fact, it is possible to obtain the optimal conditions for making the amplitude of the droplet S larger by obtaining the conditions for making the received light volume of the light receiving unit 32 the lowest based on the output of the area sensor 30 when the droplet S is oscillating.

With the modification example, the calculation method of the change amount X of S307' of the condition search process of the fifth embodiment (see FIG. 16) is changed. With the modification example, the change amount X of the output of the area sensor 30 is the difference (absolute value) between the normal value stored at S303' and the output value of the area sensor 30 when the apex of the droplet S is subducted. The output value changes when the received light volume of the light receiving unit 32 of the area sensor 30 changes during oscillation of the droplet S, but among the changing output values, the output value that shows the received light volume is low is the output value of the area sensor 30 when the apex of the droplet S is subducted. In other words, with the modification example, the controller 40 calculates the difference between the normal value stored with S303' and the output value showing the lowest received light volume among the output values that change during oscillation of the droplet S, and the absolute value of that difference can be used as the change amount X.

With this modification example as well, the controller 40 oscillates the droplet S under a plurality of conditions for which the applied voltage frequency H differs, and the frequency H for which the change amount X of the output of the area sensor 30 is the greatest is used as the optimal frequency. Then, after the condition search process noted above, the droplet S is oscillated at the optimal frequency. By doing this, the droplet oscillation device 1 can oscillate the droplet S under the conditions with a large amplitude (conditions with the greatest subduction of the apex of the droplet S).

Sixth Embodiment

With the sixth embodiment, the same as with the fifth embodiment noted above (and its modification example), when the droplet S is still (before the droplet S is oscillated), the apex of the droplet S is in a state already reaching the detection area of the area sensor 30 (in this way, the distance between the electrodes D is set).

On the other hand, with the sixth embodiment, the same as with the fourth embodiment (see FIG. 14), the condition search process is performed.

Also, with the sixth embodiment, the same as with S307 of the fourth embodiment, the change amount X of the output of the area sensor 30 is the difference (absolute value) between the output value of the light receiving unit 32 when the received light volume is lowest, and the output value of the light receiving unit 32 when the received light volume is highest. Because of this, with the sixth embodiment, it is also acceptable to not store the normal value of the area sensor 30 as with S303' of the fifth embodiment.

As can be understood from FIG. 15A and FIG. 17A, when the amplitude of the droplet S is large, the difference in the received light volume of the area sensor 30 becomes larger, and as a result, the change amount X of the output of the area sensor 30 becomes larger. Meanwhile, when the amplitude of the droplet S is small, as can be understood from FIG. 15B and FIG. 17B, the difference in the received light volume of the area sensor 30 becomes smaller, and as a result, the change amount X of the output of the area sensor 30 becomes smaller. Because of this, the set frequency H for which the change amount X is greatest becomes the condition for which the amplitude is largest.

When the droplet S is oscillated at the optimal frequency obtained with the sixth embodiment, the droplet oscillation device 1 is able to oscillate the droplet S with the conditions for which the amplitude is greatest (condition for which the apex of the droplet S is suctioned to the upper electrode 11 side, and the apex of the droplet S is the most subducted). Also, compared to the fourth embodiment and the fifth embodiment, the change amount X changes a great deal in relation to the change of the amplitude of the droplet S, so it is possible to detect the optimal frequency with good precision.

Seventh Embodiment

Figure 18:
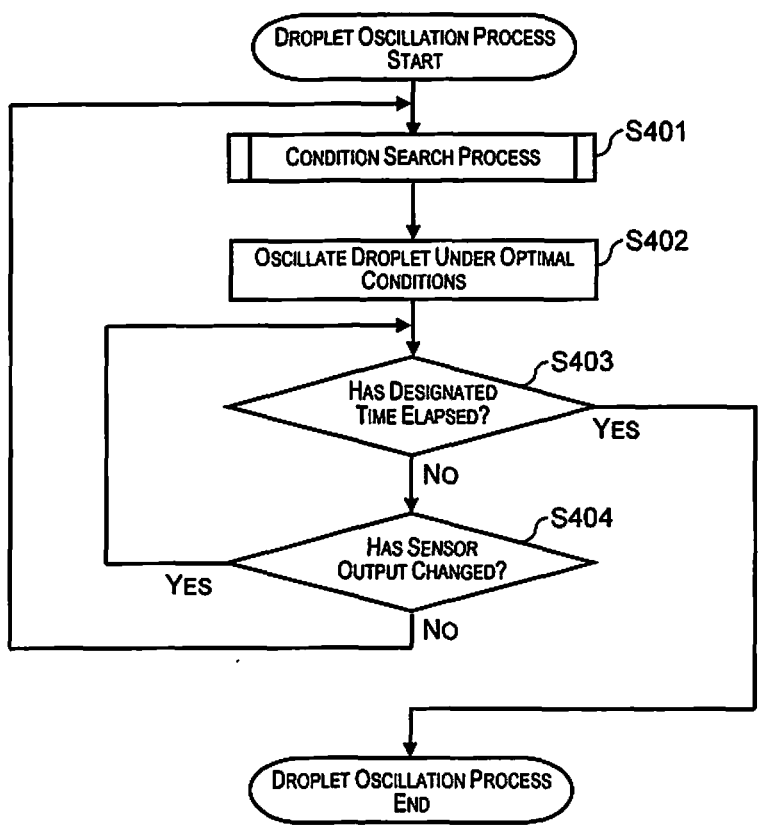
FIG. 18 is a flow chart of the droplet oscillating process of the seventh embodiment.

FIG. 18 is a flow chart of the droplet oscillating process of the seventh embodiment. With the previously described fourth embodiment through sixth embodiment, after the condition search process, the droplet oscillation device 1 oscillated the droplet S under the optimal conditions. However, while the droplet S was being oscillated, the oscillation of the droplet S changed due to things such as the moisture evaporation or a change in the contact surface area of the droplet S with the substrate W or the like. In light of that, with the seventh embodiment, changes in the oscillation of the droplet S are detected while the droplet S is being oscillated under the optimal conditions obtained with the condition search process.

First, the controller 40 executes the previously described condition search process (FIG. 14 or FIG. 16) and acquires the optimal conditions (S401), and oscillates the droplet S at the optimal frequency (S402).

Then, the controller 40 ends the droplet oscillation process when a prescribed time has elapsed (Yes at S403).

On the other hand, there are cases when before the prescribed time has elapsed (No at S403), the moisture of the droplet S evaporates, or the contact surface area between the droplet S and the substrate W expands. In this case, the droplet S may become smaller, or the amplitude of the droplet S may become smaller, and even if the droplet S is oscillated, the apex of the droplet S may not reach the detection area of the area sensor 30.

In light of that, with the controller 40, during the time until the prescribed time has elapsed, the controller 40 determines whether or not the output of the area sensor 30 has changed (S404). Then, when the output of the area sensor 30 has not changed (No at S404), the condition search process is performed again (S401). With this seventh embodiment, even when the natural oscillation frequency of the droplet S changes, it is possible to make the amplitude of the droplet S larger to the extent possible.

Eighth Embodiment

Figure 19A:
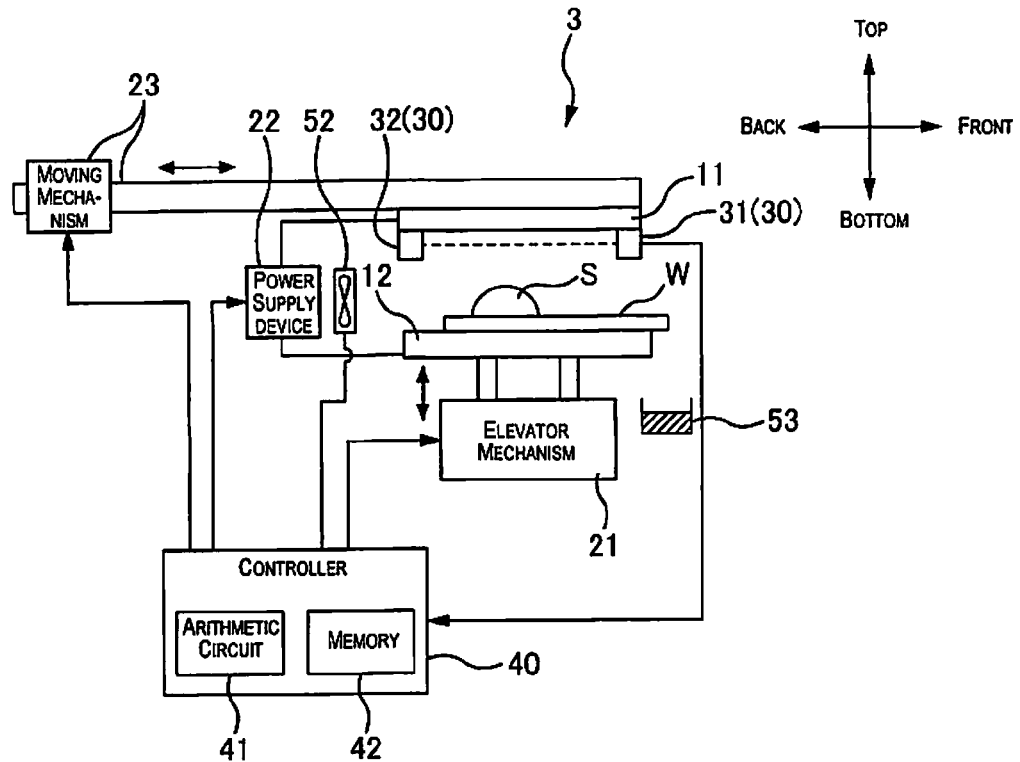
FIG. 19A and FIG. 19B are block diagrams of the reaction device 3 of the eighth embodiment.
Figure 19B:
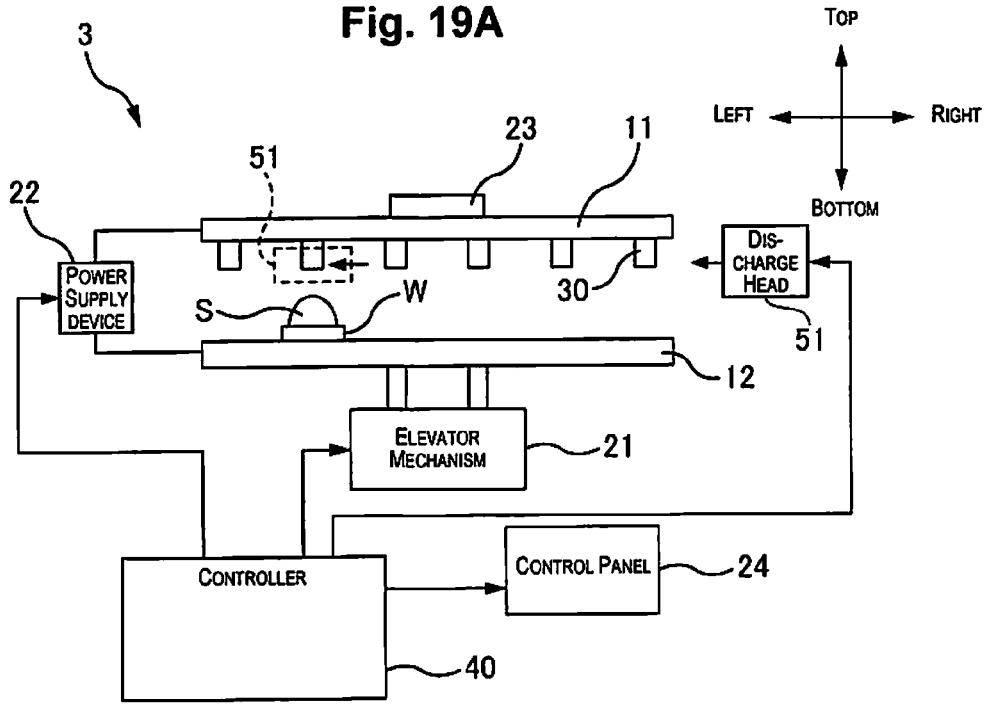

FIG. 19A and FIG. 19B are block diagrams of the reaction device 3 of the eighth embodiment. This reaction device 3, the same as the previously described droplet oscillation device 1, has the upper electrode 11, the lower electrode 12, the elevator mechanism 21, the area sensor 30, and the controller 40, and also has the function as the droplet oscillation device 1.

Here, the reaction device 3 is a device for automatically performing an antigen-antibody reaction. However, as long as it is an item that promotes a reaction by stirring the droplet S, it can be another device that automatically performs reactions.

In addition to the constitutional elements as the droplet oscillation device 1, the reaction device 3 is equipped with a moveable injection device 51, a fan 52, and a waste fluid tank 53.

The injection device 51 has a nozzle for dropping liquid. The injection device 51 can move in the lateral direction. When the upper electrode 11 is positioned at the back side, the injection device 51 moves up to the position opposite the substrate W placed on the lower electrode 12, and drops liquid toward the substrate W. Here, the injection device 51 is capable of discharge such as a primary antibody solution, a secondary antibody solution, cleaning solution and the like.

The fan 52 is an air blowing device for blowing air from the back side to the front side toward the substrate W. The droplet S on the substrate W is blown away by the wind of the fan 52, and is exhausted to the waste fluid tank 53.

The operator fixes a sliced tissue specimen on the substrate W, places the substrate W on the lower electrode 12 of the reaction device 3, and gives prescribed instructions to the control panel 24. According to the operator instructions from the control panel 24, the controller 40 of the reaction device 3 moves the injection device 51 up to the position opposite the substrate W, drops the primary antibody solution of a prescribed volume on the substrate W from the nozzle of the injection device 51, and forms the droplet S on the substrate W. After that, the controller shelters the injection device 51, moves the upper electrode 11 to the front side, and has the upper electrode 11 and the lower electrode 12 face opposite each other.

Next, the controller 40 executes the previously described condition search process, and determines the frequency H and the distance between electrodes D that are the optimal conditions. Then, the controller 40 oscillates the droplet S at the frequency H and the distance between electrodes D of the optimal conditions. By doing this, the droplet S is stirred, and the primary antibody reaction is promoted.

Next, after moving the upper electrode 11 to the back side, the controller 40 drives the fan 52, and exhausts the droplet S (primary antibody solution) on the substrate W to the waste fluid tank 53. Then, the controller 40 moves the injection device 51 to the position opposite the substrate W, repeatedly performs dropping of the cleaning solution on the substrate W from the injection device 51, and driving the fan 52 to exhaust the droplet S (cleaning solution) on the substrate W, and performs the cleaning process for removing the primary antibody solution.

It is also possible to perform the cleaning process by having the controller 40 drop a prescribed volume of cleaning solution on the substrate W, form the droplet S on the substrate W, and vary the electric field between the upper electrode 11 and the lower electrode 12 to oscillate this droplet S. By doing this, it is possible to reduce the amount of cleaning solution, and possible to make the waste fluid tank 53 more compact.

After the cleaning solution on the substrate W is exhausted, the controller 40 moves the injection device 51 to the position opposite the substrate W, drops a prescribed volume of the secondary antibody solution on the substrate W from the injection device 51, and forms the droplet S on the substrate W. After that, the controller 40 shelters the injection device 51, moves the upper electrode 11 to the front side, and has the upper electrode 11 and the lower electrode 12 face each other.

Next, the controller 40 again executes the previously described condition search process, and determines the frequency H and the distance between electrodes D that are the optimal conditions. Then, the controller 40 oscillates the droplet S at the optimal condition frequency H and distance between electrodes D. By doing this the droplet S is stirred, and the secondary antibody reaction is promoted.

After that, after moving the upper electrode 11 to the front side, the controller 40 drives the fan 52, and exhausts the droplet S on the substrate W (secondary antibody solution) to the waste fluid tank 53. Then, the controller 40 moves the injection device 51 to the position opposite the substrate W, and repeatedly performs dropping of the cleaning solution on the substrate W from the injection device 51 and driving of the fan 52 to exhaust the droplet S on the substrate W (cleaning solution), and performs the cleaning process of removing the secondary antibody solution.

After cleaning, the controller 40 notifies the operator that the reaction has ended. The operator takes the substrate W from the reaction device 3, drops a coloring liquid on the substrate W, and observes colored slices on the substrate W using a microscope.

With the reaction device 3 of this embodiment, the primary antibody reaction and secondary antibody reaction that take 60 minutes or more when simply left still can be shortened to 5 to 10 minutes by promoting the reaction by oscillating the droplet S. Also, each time the previously described condition search process (first embodiment to seventh embodiment) is executed on the primary antibody reaction or the secondary antibody reaction, even when various factors (droplet S viscosity, appropriate volume of liquid, surface tension, temperature, droplet S size and the like) change, it is possible to obtain optimal conditions that make the amplitude of the droplet S larger.

Other

The embodiments noted above are for making the present invention easier to understand, and are not to be interpreted as limiting the present invention. It goes without saying that it is possible to making changes and improvements in the present invention without straying from its gist, and that its equivalents are included in the present invention.

Applied Voltage

With the embodiments noted above, the applied voltage was a rectangular wave. However, the applied voltage is not limited to being a rectangular wave. For example, it is also possible for the applied voltage to be a sine wave or a triangular wave. To drop the part suctioned to the upper side as shown in FIG. 6B using gravity as shown in FIG. 6C and make the amplitude of the droplet S larger, it is preferable that the applied voltage be a waveform such as one with which the applied voltage can be rapidly reduced (e.g. a sawtooth wave). Also, the applied voltage is defined by the potential difference of the waveform, and for example when applied voltage of 4 kV is given between the electrodes, it is possible to have a waveform for which the potential of one electrode is 0 kV, and the potential of the other electrode is a maximum of 4 kV, or a waveform for which the potential of one electrode is −1 kV, and the potential of the other electrode is a maximum of 3 kV.

Also, with the embodiments described above, when the frequency H of the applied voltage is changed, we showed a mode by which the frequency H was lowered, but it is also possible to raise the frequency H of the applied voltage.

Changing Mechanism for Changing the Distance Between Electrodes

With the embodiments noted above, as the mechanism for changing the distance between electrodes D between the opposite upper electrode 11 and the lower electrode 12, the elevator mechanism 21 that raises and lowers the lower electrode 12 was used. However, the changing mechanism for changing the distance between electrodes D is not limited to this. For example, it is also possible to change the distance between electrodes D by raising and lowering the upper electrode 11. In this case, the moving mechanism 23 can move the lower electrode 12 rather than the upper electrode 11 in the front-back direction.

Substrate

With the embodiments described above, a water repellent circle is drawn on the substrate W, and the droplet S was formed on the water repellent circle. However, it is also possible to form the droplet S without drawing a water repellent circle on the substrate W.

Area Sensor

With the embodiments described above, we showed an example of providing the area sensor 30 at the lower side of the upper electrode 11, but it is also possible to provide the area sensor 30 on the device main unit.

Also, with the embodiments described above, we showed an example of the area sensor 30 having the light emitting unit 31 and the light receiving unit 32, but it is also possible to have the light emitting unit 31 and the area sensor 30 be separate constitutions.

General Interpretation Of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A droplet oscillation device comprising:
    an upper electrode;
    a lower electrode configured and arranged to support a substrate thereon;
    a changing mechanism configured and arranged to change a distance between the upper electrode and the lower electrode opposite each other;
    a sensor configured and arranged to detect a droplet formed above a surface of the substrate opposite to the upper electrode; and
    a controller configured to vary an applied voltage applied between the upper electrode and the lower electrode to oscillate the droplet, and to determine whether or not the droplet is detected by the sensor, the controller being configured to respectively determine whether or not the droplet is detected by the sensor under a plurality of conditions for which a frequency of the applied voltage or the distance are different, and to oscillate the droplet at the frequency and the distance of a condition among the plurality of conditions for which the droplet is detected by the sensor and for which the distance is greatest.

2. The droplet oscillation device according to claim 1, wherein
    the controller is configured to gradually change the distance while keeping the frequency of the applied voltage at a first frequency, and to respectively determine whether or not the droplet is detected by the sensor, and
    the controller is further configured to change the frequency of the applied voltage from the first frequency to a second frequency, to gradually change the distance while keeping at the second frequency, and to respectively determine whether or not the droplet is detected by the sensor.

3. The droplet oscillation device according to claim 2, wherein
    the controller is configured to gradually change the distance, and when reaching a state when the droplet is not detected by the sensor from a state when the droplet is detected by the sensor, or when reaching a state when the droplet is detected by the sensor from a state when the droplet is not detected by the sensor, to change the frequency of the applied voltage from the first frequency to the second frequency.

4. The droplet oscillation device according to claim 1, wherein
    the controller is configured to gradually change the frequency while keeping the distance at a first distance, to respectively determine whether or not the droplet is detected by the sensor, to change from the first distance to a second distance, to gradually change the frequency while keeping at the second distance, and to respectively determine whether or not the droplet is detected by the sensor.

5. The droplet oscillation device according to claim 1, wherein
    the sensor is an area sensor having a detection area having a width in a direction parallel to a surface of the lower electrode on which the substrate is to be placed.

6. The droplet oscillation device according to claim 1, wherein
    the controller is configured to narrow the distance and to oscillate the droplet when the droplet is no longer detected by the sensor after the droplet was detected by the sensor and the droplet was oscillated at the frequency and the distance of the condition for which the distance is the greatest.

7. The droplet oscillation device according to claim 1, further comprising an injection device configured and arranged to discharge a liquid as the droplet on the substrate placed on the lower electrode.

8. A droplet oscillation device comprising:

an upper electrode;

a lower electrode configured and arranged to support a substrate thereon;

a sensor configured and arranged to detect a droplet formed above a surface of the substrate opposite to the upper electrode, the sensor having a light receiving unit configured and arranged to output signals according to a received light volume of the light receiving unit; and a controller configured to vary an applied voltage applied between the upper electrode and the lower electrode to oscillate the droplet on the substrate, the controller being configured to oscillate the droplet under a plurality of conditions for which a frequency of the applied voltage is different, and to oscillate the droplet at the frequency of a condition among the plurality of conditions for which a signal change amount of the output signals from the light receiving unit is greatest.

9. The droplet oscillation device according to claim 8, wherein the sensor has a detection area between the upper electrode and the lower electrode, and the controller is configured to set the distance between the upper electrode and the lower electrode so that the detection area of the sensor is higher than an apex of the droplet when the droplet is still, and to oscillate the droplet under the plurality of conditions for which the frequency of the applied voltage is different.

10. The droplet oscillation device according to claim 8, wherein the sensor has a detection area between the upper electrode and the lower electrode, and the controller is configured to set the distance between the upper electrode and the lower electrode so that the detection area of the sensor is lower than an apex of the droplet when the droplet is still, and to oscillate the droplet under the plurality of conditions for which the frequency of the applied voltage is different.

11. The droplet oscillation device according to claim 10, wherein the controller is configured to use as the signal change amount a difference between, among the plurality of conditions, an output signal from the sensor when the droplet is still, and an output signal from the sensor indicating a greatest received light volume during oscillation of the droplet.

12. The droplet oscillation device according to claim 9, wherein the controller is configured to use as the signal change amount a difference between, among the plurality of conditions, an output signal from the sensor when the droplet is still, and an output signal from the sensor indicating a lowest received light volume during oscillation of the droplet.

13. The droplet oscillation device according to claim 9, wherein the controller is configured to use as the signal change amount a difference between, among the plurality of conditions, an output signal from the sensor indicating a greatest received light volume during oscillation of the droplet, and an output signal from the sensor indicating a lowest received light volume during oscillation of the droplet.

* * * * *